(12) United States Patent
Imai et al.

(10) Patent No.: US 9,781,384 B2
(45) Date of Patent: Oct. 3, 2017

(54) INFORMATION PROCESSING SYSTEM, INFORMATION PROCESSING APPARATUS, INFORMATION PROCESSING METHOD, AND RECORDING MEDIUM

(71) Applicants: Takuya Imai, Tokyo (JP); Kenichiro Morita, Tokyo (JP); Shoh Nagamine, Kanagawa (JP); Junpei Mikami, Kanagawa (JP)

(72) Inventors: Takuya Imai, Tokyo (JP); Kenichiro Morita, Tokyo (JP); Shoh Nagamine, Kanagawa (JP); Junpei Mikami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/340,439

(22) Filed: Nov. 1, 2016

(65) Prior Publication Data

US 2017/0134697 A1    May 11, 2017

(30) Foreign Application Priority Data

Nov. 6, 2015    (JP) ................................ 2015-218541

(51) Int. Cl.
*H04N 7/15* (2006.01)
*H04M 3/56* (2006.01)

(52) U.S. Cl.
CPC .............. *H04N 7/15* (2013.01); *H04M 3/568* (2013.01)

(58) Field of Classification Search
None
See application file for complete search history.

(56) References Cited

U.S. PATENT DOCUMENTS

| 8,713,148 B2 | 4/2014 | Imai et al. |
| 8,850,184 B2 | 9/2014 | Imai |
| 9,210,371 B2 | 12/2015 | Morita et al. |
| 9,374,556 B2 | 6/2016 | Nagamine et al. |
| 2003/0210659 A1* | 11/2003 | Chu ........................ G10L 19/00 370/320 |

(Continued)

FOREIGN PATENT DOCUMENTS

JP    2014-236472    12/2014

*Primary Examiner* — Creighton Smith
(74) *Attorney, Agent, or Firm* — Oblon, McClelland, Maier & Neustadt, L.L.P.

(57) ABSTRACT

Disclosed is an information processing system including a first information processing terminal and an information processing apparatus coupled to the first information processing terminal. The information processing system includes a storage configured to store codec data, the codec data including at least one first codec capable of being used for performing first communications between the first information processing terminal and a second information processing terminal differing from the first information processing terminal, a determiner configured to determine a second codec for performing second communications between the first information processing terminal, the second information processing terminal, and a third information processing terminal differing from the second information processing terminal, based on the codec data, and a switcher configured to switch a third codec currently used for performing the first communications, the third codec being selected from the first codec.

5 Claims, 15 Drawing Sheets

(56) References Cited

U.S. PATENT DOCUMENTS

| | | |
|---|---|---|
| 2014/0118475 A1 | 5/2014 | Nagamine et al. |
| 2014/0354767 A1 | 12/2014 | Imai |
| 2014/0362718 A1 | 12/2014 | Nagamine et al. |
| 2014/0368410 A1 | 12/2014 | Imai et al. |
| 2015/0365727 A1 | 12/2015 | Nagamine et al. |
| 2016/0080449 A1 | 3/2016 | Nagamine et al. |
| 2016/0094594 A1 | 3/2016 | Imai et al. |
| 2016/0094595 A1 | 3/2016 | Shiro et al. |
| 2016/0112675 A1 | 4/2016 | Morita et al. |
| 2016/0277462 A1 | 9/2016 | Morita et al. |

* cited by examiner

INFORMATION PROCESSING SYSTEM, INFORMATION PROCESSING APPARATUS, INFORMATION PROCESSING METHOD, AND RECORDING MEDIUM

CROSS-REFERENCE TO RELATED APPLICATIONS

The present application claims the benefit of priority under 35 U.S.C. §119 of Japanese Patent Application No. 2015-218541, filed on Nov. 6, 2015, the contents of which are incorporated herein by reference in their entirety.

BACKGROUND OF THE INVENTION

1. Field of the Invention

The disclosures discussed herein relate to an information processing system, an information processing apparatus, an information processing method, and a non-transitory computer-readable recording medium storing an information processing program.

2. Description of the Related Art

Related art technologies provide methods to conduct video conferences or TV conferences by mutually transmitting images and the like between multiple locations. Transmission of images and the like is frequently performed by encoding video data to transmit the encoded data.

When encoding schemes for encoding data differ between the terminals that attend the conference (hereinafter also called "conference attending terminals") and a server that receives signals transmitted from the conference attending terminals, the server may frequently fail to decode the transmitted signals. Japanese Unexamined Patent Application Publication No. 2014-236472 discloses, for example, a following method to prevent the decoding of the signals from failing. In this method, an apparatus such as a gateway apparatus initially detects two encoding schemes, namely, a first encoding scheme used by the server for performing communications with the conference attending terminals and a second encoding scheme used by the conference attending terminals for performing communications with the server. The gateway apparatus subsequently determines whether the first encoding scheme matches the second encoding scheme. When the gateway apparatus determines that the first encoding scheme does not match the second encoding scheme, the gateway apparatus encodes signals received from the server with a second encoding scheme to transmit the encoded signals to the conference attending terminals, and also encodes signals received from the conference attending terminals with the first encoding scheme to transmit the encoded signals to the server. When the gateway apparatus determines that the first encoding scheme does not match the second encoding scheme, the gateway apparatus performs, instead of the conference attending terminals, negotiations between the server and the conference attending terminals.

RELATED-ART DOCUMENT

Patent Document

Patent Document 1: Japanese Unexamined Patent Application Publication No. 2014-236472

SUMMARY OF THE INVENTION

An aspect of the present invention is directed to providing an information processing system capable of reducing process burdens for performing communications.

According to an embodiment, an information processing system includes a first information processing terminal and an information processing apparatus coupled to the first information processing terminal. The information processing system includes a storage configured to store codec data, the codec data including at least one first codec capable of being used for performing first communications between the first information processing terminal and a second information processing terminal differing from the first information processing terminal; a determiner configured to determine a second codec for performing second communications between the first information processing terminal, the second information processing terminal, and a third information processing terminal differing from the second information processing terminal, based on the codec data; and a switcher configured to switch a third codec currently used for performing the first communications, the third codec being selected from in the first codec.

Other objects, features and advantages of the present invention will become more apparent from the following detailed description when read in conjunction with the accompanying drawings.

DETAILED DESCRIPTION OF THE PREFERRED EMBODIMENTS

The related art technology needs to have the server perform conversions or the like in order to conduct communications. The conversions may thus impose substantial processing-related burdens on the server.

The following illustrates preferred embodiments with reference the accompanying drawings. Note that duplicated descriptions may be omitted by assigning identical reference numbers to those components having substantially the same functional configurations in the specification and the drawings of the present application.

Overall Configuration Example

Figure 1:
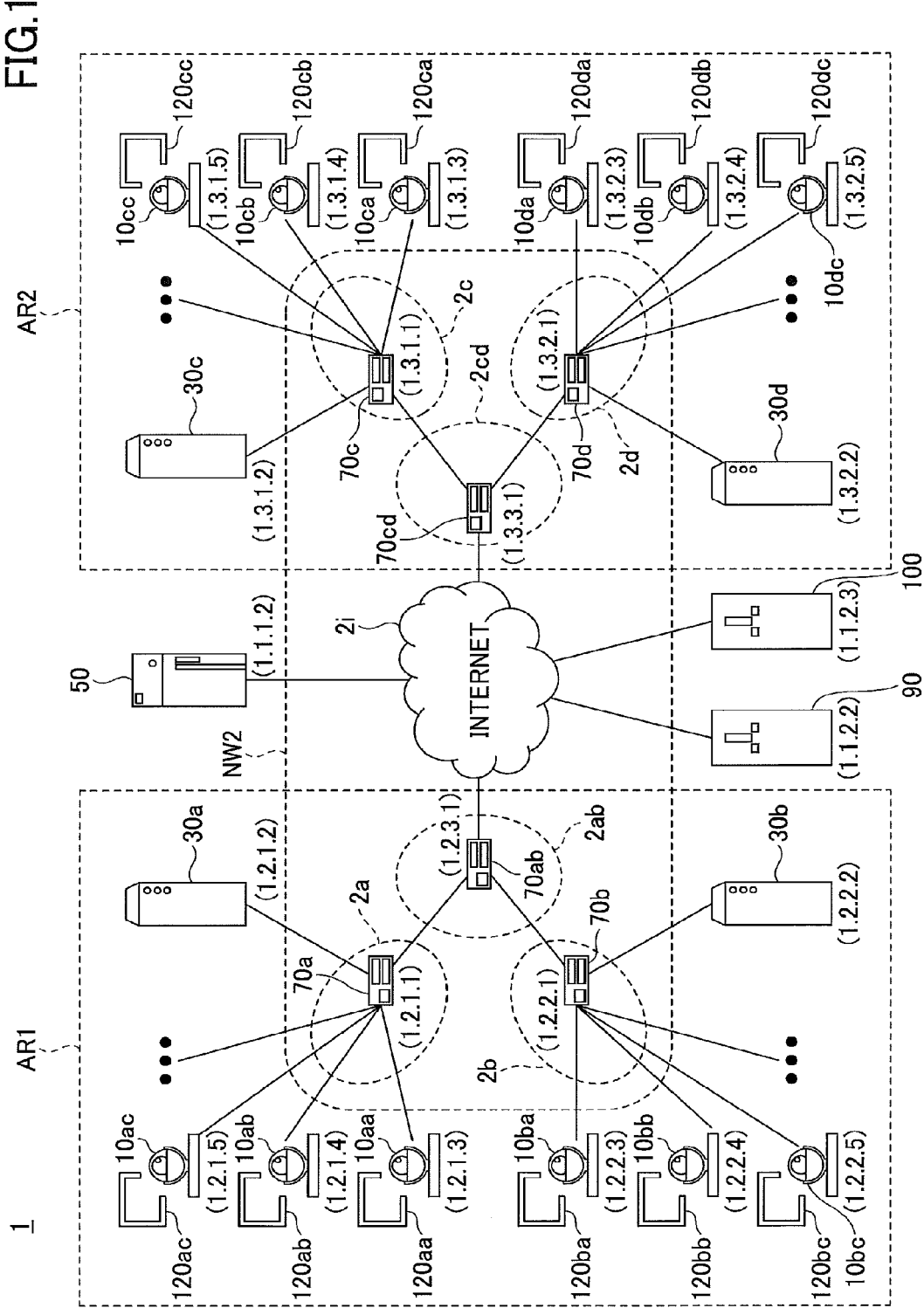
FIG. 1 is a schematic diagram illustrating an overall configuration example of an information processing system according to an embodiment.

FIG. 1 is a schematic diagram illustrating an overall configuration example of an information processing system according to an embodiment. The following illustration is given based on an example of an information processing system 1.

The information processing system 1 may be a transmission system configured to transmit content data and the like, a communications system configured to perform communications between multiple information processing terminals, or a combination of the transmission system and the communications system. Specifically, communications are performed by transmitting or receiving data indicating image data, voice data, or a combination of the image data and the voice data in the information processing system 1. Note that the images include static images moving images or combinations of the static and moving images. For example, the information processing system 1 may be a so-called a TV conference system, a TV telephone system, or the like. The following illustration is given based on an example of the TV conference system that serves as the information processing system 1.

In the following example of the TV conference system, an information processing terminal serving as a request source that transmits a request for starting a TV conference is called a "request source terminal". Further, an information processing terminal serving as a request destination that receives the request for starting the TV conference is called a "destination terminal".

The information processing system 1 illustrated in FIG. 1 includes multiple information processing terminals including an information processing terminal 10aa and an information processing terminal 10dc that serve as a first information processing terminal and a second information processing terminal. In this example, multiple information processing terminals 10aa to 10dc include displays 120aa to 120dc.

In this example, it is assumed that the information processing terminal 10aa to an information processing terminal 10bc among multiple information processing terminals are installed in a first area AR1. On the other hand, it is assumed that an information processing terminal 10cc to the information processing terminal 10dc among the multiple information processing terminals are installed in a second area AR2. In the following illustration, any one of the information processing terminals 10aa to 10dc may be called an "information processing terminal 10".

In this example, relay apparatuses 30a to 30d relays content data in order to transmit or receive the content data between the multiple information processing terminals. In the following illustration, any one of the relay apparatuses 30a to 30d may be called a "relay apparatus 30".

In this example, a management system 50 serving as an example of an information processing apparatus is configured to perform so-called login authentication when a user of the terminal 10 performs a login operation. In addition, the management system 50 manages call statuses of the information processing terminals 10, a destination list, communications statuses of the relay apparatuses 30, and the like.

In this example, multiple routers 70a, 70b, 70c, 70d, 70ab, and 70cd are employed. In the following illustration, any one of the routers 70a, 70b, 70c, 70d, 70ab, and 70cd may be called a "router 70". Each of the routers 70a, 70b, 70c, 70d, 70ab, and 70cd is configured to select an optimal route for transmitting and receiving data.

In this example, a program providing system 90 is employed. The program providing system 90 includes a storage device such as hard disk (HD) and the like. The program providing system 90 stores a terminal program to allow the terminal 10 to implement various types of functions or allow the information processing terminal 10 to serve as various types of components. The program providing system 90 may further be able to transmit the stored terminal program to the terminal 10. Similarly, the program providing system 90 stores a relay apparatus program to allow the relay apparatus 30 to implement various types of functions or allow the relay apparatus 30 to serve as various types of components. The program providing system 90 may further be able to transmit the stored relay apparatus program to the relay apparatus 30. In addition, the program providing system 90 stores a management system program to allow the management system 50 to implement various types of functions or allow the management system 50 to serve as various types of components. The program providing system 90 may further be able to transmit the stored management system program to the management system 50.

In this example, a maintenance system 100 is employed. The maintenance system 100 is a computer configured to perform maintenance, management, and repair on the terminals 10, the relay apparatuses 30, the management system 50, the program providing system 90, and the like. For example, it is assumed that the maintenance system 100 is installed domestically. On the other hand, it is assumed that the terminals 10, the relay apparatuses 30, the management system 50, and the program providing system 90 are installed internationally. In such an example, the maintenance system 100 performs perform maintenance, management, and repair on the terminals 10, the relay apparatuses 30, the management system 50, the program providing system 90, and the like via the communications network 2. The maintenance system 100 is a computer configured to perform maintenance including management of the model numbers, sales destinations, maintenance and inspection or failure histories of the terminals 10, the relay apparatuses 30, the management system 50, the program providing system 90, and the like.

As illustrated in FIG. 1, the terminals 10aa to 10ac, the relay apparatus 30a, the router 70a, and the like are coupled via a LAN 2a to perform communications with one another. Similarly, the terminals 10ba to 10bc, the relay apparatus 30b, and the router 70b, and the like are coupled via a LAN 2b to perform communications with one another. The LAN 2a and LAN 2b are coupled via a dedicated line 2ab including a router 70ab to perform communications with one another. It is assumed that the LAN 2a and LAN 2b are constructed within the predetermined first area AR1. For example, the first area AR1 is Japan. It is assumed that the LAN 2a is constructed within a Tokyo Office and the LAN 2b is constructed with an Osaka Office.

Meanwhile, the terminals 10ca to 10cc, the relay apparatus 30c, and the router 70c, and the like are coupled via a LAN 2c to perform communications with one another. Similarly, the terminals 10da to 10dc, the relay apparatus 30d, and the router 70d, and the like are coupled via a LAN 2d to perform communications with one another. The LAN 2c and LAN 2d are coupled via a dedicated line 2cd including a router 70cd to perform communications with one another. It is assumed that the LAN 2c and LAN 2d are constructed within a predetermined second area AR2. For example, the second area AR2 is the United States of America (USA). It is assumed that the LAN 2c is constructed within a New York (NY) Office and the LAN 2d is constructed with a Washington, D.C. Office. The first area AR1 and the second area AR2 are coupled via respective routers from the Internet 2i to perform communications with each other.

As illustrated in FIG. 1, the management system 50 and the program providing system 90 are coupled to the terminals 10, the relay apparatuses 30, and the like via the Internet 2i to perform communications with one another. Note that the management system 50 and the program providing system 90 may be installed in the first area AR1, the second area AR2, or areas other than the first area AR1, the second area AR2.

FIG. 1 illustrates an example of the communications network 2 that is composed of the LAN 2a, the LAN 2b, the LAN 2c, the LAN 2d, the dedicated line 2ab, the dedicated line 2cd, and the Internet 2i. Note that the communications network 2 may include wireless communications such as Wireless Fidelity (Wi-Fi) (registered trademark) or Bluetooth (registered trademark) in addition to wired cables.

Note that FIG. 1 depicts IP addresses set in the apparatuses and the system The illustrated IP addresses are examples of IPv4. For example, the IP address "1.2.1.3" is set in the terminal 10aa. Note that the IP addresses used may be IPv6.

The function of the terminals 10 is not limited to the communication function to talk over the telephones between the different offices or between the different rooms within the same office. The terminals 10 may be used as the communication function to talk over the telephones within the same room or between indoor and outdoor. Note that when the terminals 10 used as the communication function to talk over the telephones outdoor may perform communications with wireless communications such as mobile phone communications networks.

Figure 2:
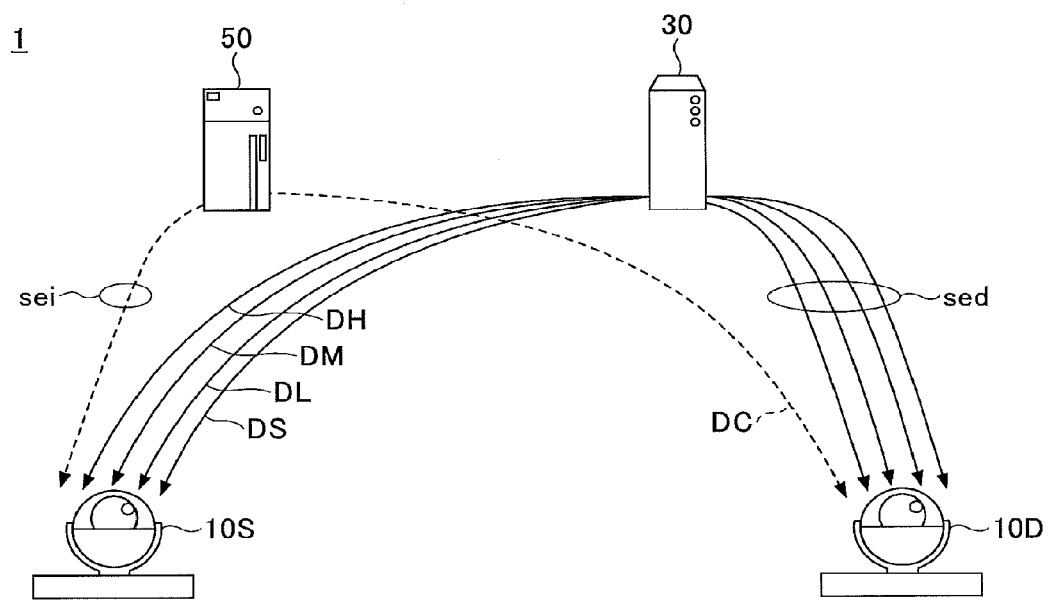
FIG. 2 is a schematic diagram illustrating an example of communications in the information processing system according to an embodiment.

FIG. 2 is a schematic diagram illustrating an example of communications in the information processing system according to an embodiment. In the information processing system 1, one of information processing terminals 10aa to 10dc (see FIG. 1) may serve as a request source terminal 10S. On the other hand, one of information processing terminals 10aa to 10dc excluding the request source terminal 10S may serve as a destination terminal 10D.

Initially, in the information processing system 1, a management information session sei is established between the request source terminal 10S and the destination terminal 10D for transmitting or receiving various types of management information DC via the management system 50.

Further, high resolution image data DH, intermediate resolution image data DM, low resolution image data DL, audio data DS, and the like are transmitted or received between the request source terminal 10S and the destination terminal 10D. Note that four sessions are established to transmit or receive data including the high resolution image data DH, intermediate resolution image data DM, low resolution image data DL, audio data DS, and the like. The four sessions may be called an image and audio data session sed in the following illustration. The image and audio data may be transmitted or received via the relay apparatus 30 by the image and audio data session sed, as illustrated in FIG. 2.

Figures 3A, 3B, 3C:
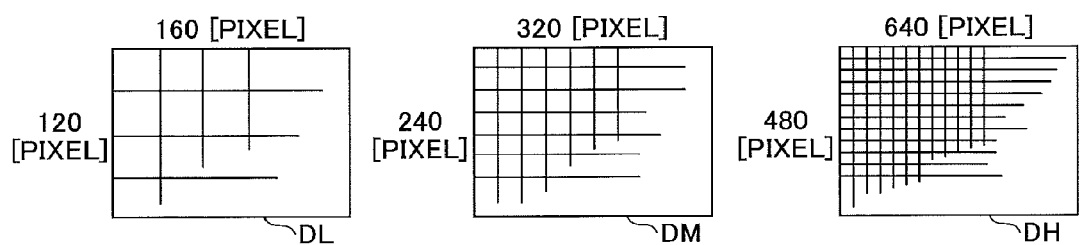
FIGS. 3A to 3C are schematic diagrams illustrating examples of image qualities transmitted and received in the information processing system according to an embodiment.

FIGS. 3A to 3C are schematic diagrams illustrating examples of image qualities transmitted and received in the information processing system 1 according to an embodiment. FIG. 3A depicts an example of an image represented by the low resolution image data DL. FIG. 3B depicts an example of an image represented by the intermediate resolution image data DM. FIG. 3C depicts an example of an image represented by the high resolution image data DH.

Specifically, the image represented by the low resolution image data DL includes 160 by 120 pixels. The image represented by the intermediate resolution image data DM includes 320 by 240 pixels. The image represented by the high resolution image data DH includes 640 by 480 pixels.

For example, the low resolution image data DL are and received via the narrowband route. On the other hand, the low resolution image data DL and the intermediate resolution image data DM are transmitted and received via the relatively wideband route. In addition, the low resolution image data DL, the intermediate resolution image data DM, and the high resolution image data DH are transmitted and received via the wider band route.

Hardware Configuration Example

Figure 4:
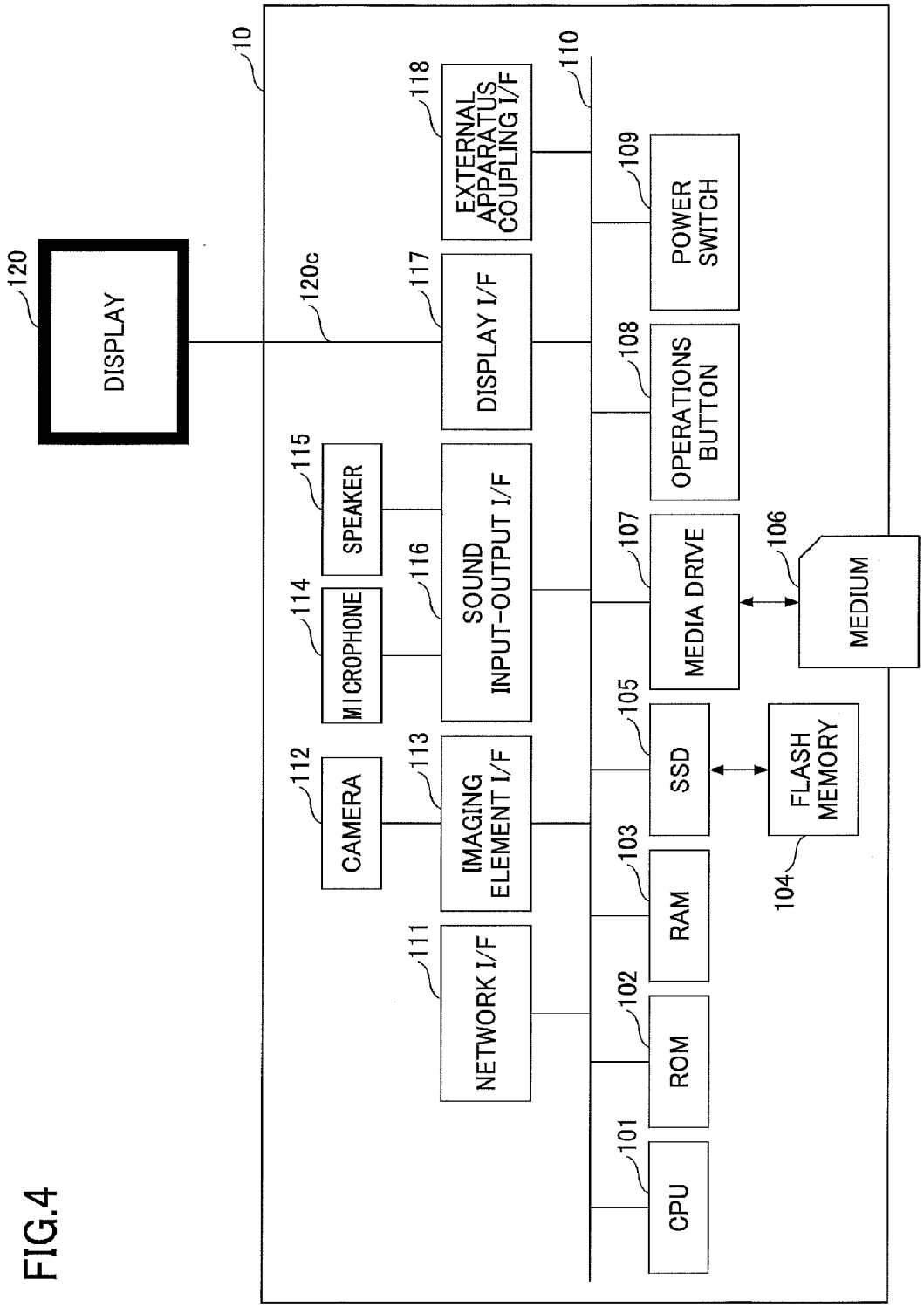
FIG. 4 is a block diagram illustrating a hardware configuration example of an information processing terminal according to an embodiment.

FIG. 4 is a block diagram illustrating a hardware configuration example of an information processing terminal according to an embodiment. As illustrated in FIG. 4, the terminal 10 includes a central processing unit (CPU) 101, a read-only memory (ROM) 102, and a random access memory (RAM) 103. The terminal 10 further includes a flash memory 104, a solid state drive (SSD 105), a media drive 107, an operation button 108, and a power switch 109. The terminal 10 further includes a network interface (I/F) 111, a camera 112, an imaging element I/F 113, a microphone 114, a speaker 115, an audio input output I/F 116, a display I/F 117, and an external apparatus coupling T/F 118. The above-described hardware components are coupled via a bus line 110. The terminal 10 thus serves as a computer.

The CPU 101 includes processors configured to perform computation to implement processes and data processes performed by the terminal 10. The CPU 101 serves as control device configured to control the hardware components. The overall operations of the terminal 10 may thus be controlled by the CPU 101.

The ROM 102, the RAM 103, the flash memory 104, and the SSD 105 are examples of a storage. For example, the ROM 102 stores programs such as initial program loader (IPL) and the like for use in driving the CPU 101. The RAM 103 is an example of a main storage used as a work area of the CPU 101. Further, the SSD 105 is configured to store terminal programs and data including image data audio data in the flash memory 104, based on the control of the CPU 101.

The media drive 107 is configured to couple a medium 106 including recording media such as a flash memory and an optical disk to the terminal 10. The media drive 107 is configured to read data from or write data on the medium 106.

The operation button 108 is an example input device via which the user inputs operations. For example, the operation button 108 is used when the user selects a destination for the terminal 10 to perform communications with.

The power switch 109 is used to switch the power of the terminal 10 ON or OFF.

The network I/F 111 serves as an interface configured to couple the terminal 10 to the network. For example, the network N I/F 111 is configured to transmit to an external apparatus or receive from the external apparatus data via the communications network 2.

The camera 112 is configured to image a subject to generate image data of the subject. The camera 112 is controlled by the imaging element I/F 113. For example, the imaging element I/F 113 may transmit the image data generated by the camera 112 to the external apparatus via the communications network 2.

The microphone 114 is configured to input voice of a user to generate audio data of the user. The speaker 115 is configured to output voice based on the audio data. The audio input-output I/F 116 is configured to control the microphone 114 and the speaker 115.

The display I/F 117 is coupled to a display 120 via a cable 120c. The display 120 is an example of an output device configured to display images and icons or the like. The cable 120c may be an analog RGB (VGA) signal cable, a component video cable, high-definition multimedia interface (HDMI) (registered trademark) cable, a digital visual interface (DVI) cable, or the like.

Figure 5:
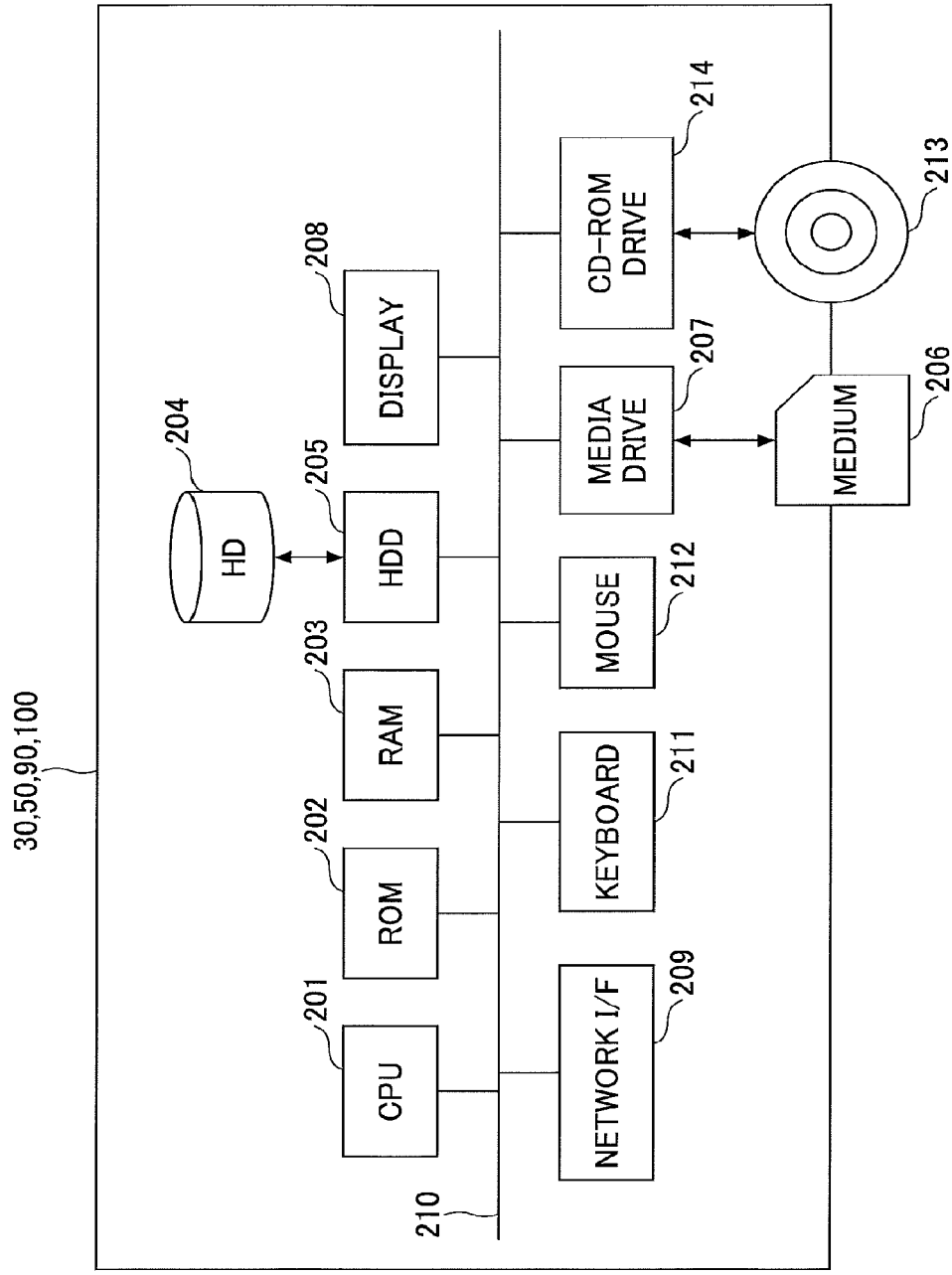
FIG. 5 is a block diagram illustrating a hardware configuration example of an information processing apparatus according to an embodiment.

FIG. 5 is a block diagram illustrating a hardware configuration example of an information processing apparatus according to an embodiment. As illustrated in FIG. 5, the relay apparatus 30, the management system 50, the program providing system 90, and the maintenance system 100 may have same hardware configurations. In the following, it is assumed that the relay apparatus 30, the management system 50, the program providing system 90, and the maintenance system 100 have same hardware configurations, and illustration is given by taking the relay apparatus 30 as an example.

The relay apparatus 30 includes a CPU 201, a ROM 202, a RAM 203, a hard disk (HD) 204, a hard disk drive (HDD) 205, a media drive 207, a display 208, and a network I/F 209. The relay apparatus 30 also includes a keyboard 211, a mouse 212, and a CD-ROM drive 214. The above-described hardware components are coupled via a bus line 210. The relay apparatus 30 thus serves as a computer.

The CPU 201 includes processors configured to perform computation to implement processes and data processes performed by the relay apparatus 30. The CPU 201 serves as control device configured to control the hardware components. The overall operations of the relay apparatus 30 may thus be controlled by the CPU 201.

The ROM 202, the RAM 203, the HD 204, and the HDD 205 are examples of a storage. For example, the ROM 202 stores programs such as an IPL and the like for use in driving the CPU 201. The RAM 203 is an example of a main storage used as a work area of the CPU 201. Further, the HDD 205 is configured to store relay apparatus programs and data including image data audio data in the HD 204, based on the control of the CPU 201.

The media drive 207 is configured to couple a medium 206 including recording media such as a flash memory and an optical disk to the relay apparatus 30. The media drive 207 is configured to read data from or write data on the medium 206.

The display 208 is an example of an output device configured to display images and icons or the like.

The network N I/F 209 serves as an interface configured to couple the relay apparatus 30 to the network. For example, the network N I/F 209 is configured to transmit to an external apparatus or receive from the external apparatus data via the communications network 2.

The keyboard 211 and a mouse 212 are an example input device via which the user inputs operations.

The CD-ROM drive 214 is configured to couple a medium 213 serving as a recording medium such as a CD-ROM to the relay apparatus 30. The CR-ROM drive 214 is configured to read data from or write data on the medium 213.

Functional Configuration Example

Figure 6:
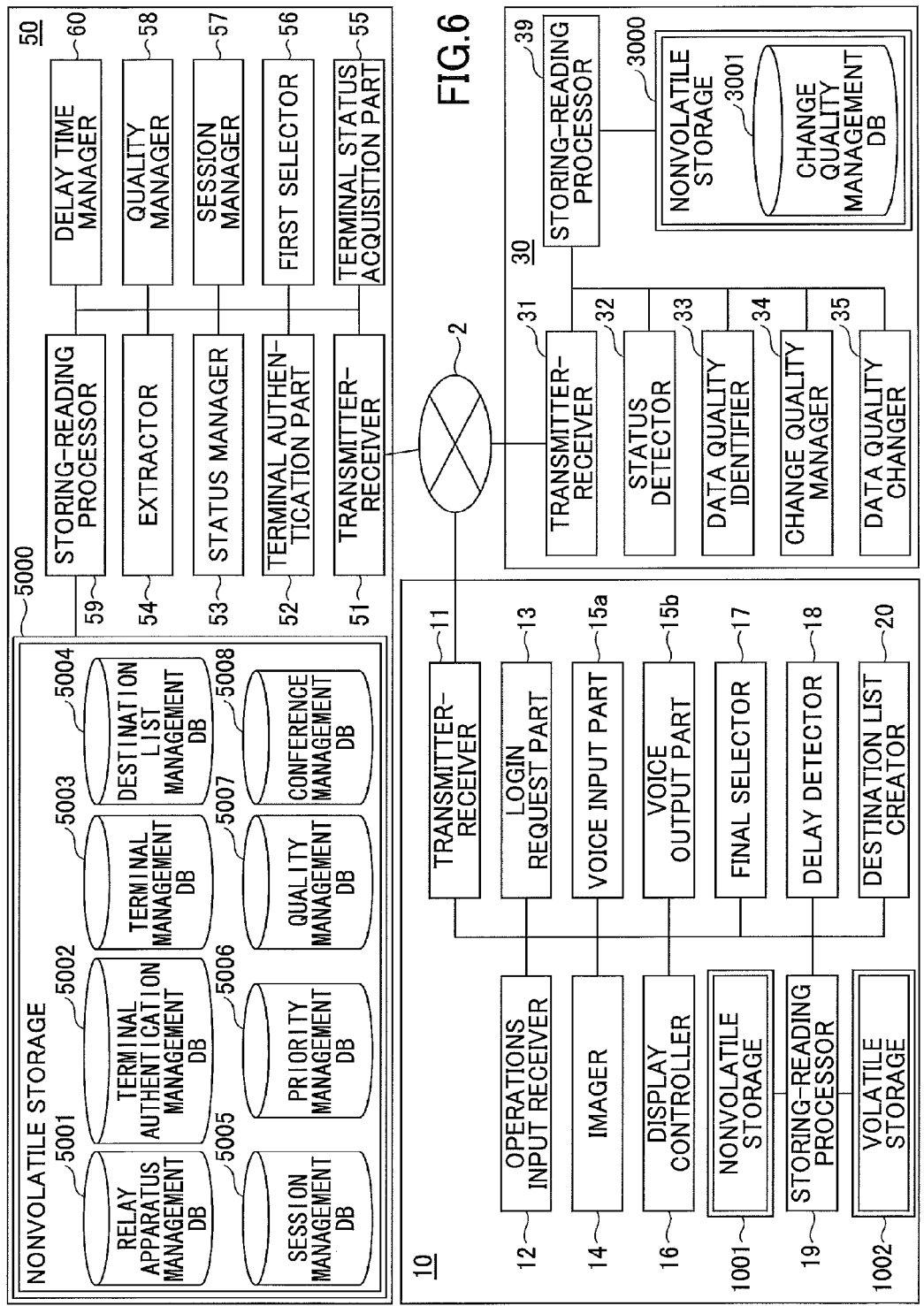
FIG. 6 is a functional block diagram illustrating a functional configuration example of the information processing system according to an embodiment.

FIG. 6 is a functional block diagram illustrating a functional configuration example of the information processing system according to an embodiment.

For example, the terminal 10 includes a transmitter-receiver 11, an operation input receiver 12, a login request part 13, an imager 14, a voice input part 15a, a voice output part 15b, a display controller 16, a final selector 17, a delay detector 18, a storing-reading processor 19, and a destination list creator 20. The terminal 10 further includes a nonvolatile storage 1001 and a volatile storage 1002.

The transmitter-receiver 11 is configured to transmit to an external apparatus or receive from the external apparatus data via the communications network 2. Note that the transmitter-receiver 11 may be implemented, for example, by the network I/F 111 (FIG. 4) or the like. The transmitter-receiver 11 receives data indicating statuses of the terminals 10 serving as destination candidates from the management system 50 before starting communications with a destination terminal. Note that the data indicating the statuses of the terminals 10 are not limited to the operating statuses of the terminals 10. For example, the data indicating the statuses of the terminals 10 may include data indicating online or offline, currently in communications or not currently in communications in addition to the online status, or away from keyboard (AFK). The data indicating statuses of the terminals include various types of statuses including a status of a cable being detached from any of the terminals, a status capable of outputting voice while failing to output images, or a status of failing to output voice and sound (a so-called "mute").

The operation input receiver 12 is configured to receive various types of operations from the user. Note that the operation input receiver 12 may be implemented, for example, by the operation button 108 (FIG. 4), the power switch 109 (FIG. 4), and the like.

The login request part 13 is configured to request login when the power is switched ON. Note that the login request part 13 may be implemented, for example, by the network N T/F 111 (FIG. 4), and the like. Specifically, when the power is switched ON, the login request part 13 transmits data indicating a login request and an IP address of the request source terminal to the management system 50 via the communications network 2. On the other hand, when the power is switched OFF, the login request part 13 transmits data indicating the power to be OFF to the management system 50 via the communications network 2. The management system 50 may be able to detect whether the power of each of the terminals is ON or OFF.

The imager 14 is configured to image a subject such as a user, generate image data of the user, and output the generated image data of the user. Note that the imager 14 may be implemented, for example, by the camera 112 (FIG. 4), the imaging element I/F 113 (FIG. 4), and the like.

The voice input part 15*a* is configured to input sound and voice such as a user's voice to generate audio data. Note that the voice input part 15*a* may be implemented, for example, by the microphone 114 (FIG. 4), the audio input output I/F 116 (FIG. 4), and the like.

The voice output part 15*b* is configured to output voice based on the received audio data. Note that the voice output part 15*b* may be implemented, for example, by the speaker 115 (FIG. 4) and the audio input output I/F 116 (FIG. 4), and the like.

The display controller 16 is configured to control displaying images on the display 120 (FIG. 4) or the like. Note that the display controller 16 may be implemented, for example, by the display I/F 117 (FIG. 4) and the like.

The final selector 17 is configured to finally select one of the relay apparatuses among the multiple relay apparatuses. Note that the final selector 17 may be implemented, for example, by the CPU 101 and the like.

The delay detector 18 is configured to detect delay time (e.g., the unit system is ms) in receiving audio data and image data from the external apparatus. Note that the delay detector 18 may be implemented, for example, by the CPU 101 and the like.

The storing-reading processor 19 is configured to read data from or store data in the nonvolatile storage 1001 and the volatile storage 1002. Note that the storing-reading processor 19 may be implemented, for example, by the SSD 105 or the like. For example, the nonvolatile storage 1001 stores data including a terminal identifier (ID) and a password for identifying the terminal 10. The volatile storage 1002 stores image data and audio data received during communications. In this case, the image data and audio data are overwritten in the volatile storage 1002 every time the volatile storage 1002 receives the image data and audio data. The images or voice are output based on the image data and audio data stored in the volatile storage 1002.

The destination list creator 20 is configured to create and update a destination list indicating the destination candidate terminals based on a destination list and data including statuses of the destination terminal candidates received from the management system 50. Note that the destination list creator 20 may be implemented, for example, by the network I/F 111 and the like.

Note that each of the IDs including the terminal IDs and the relay apparatus IDs indicates characters, symbols, signs, graphics, numerical values, or a combination of the characters, the symbols, the signs, the graphics, and the numerical values.

The relay apparatus 30 includes a transmitter-receiver 31, a status detector 32, a data quality identifier 33, a change quality manager 34, a data quality changer 35, a reading-storing processor 39, and a nonvolatile storage 3000.

The nonvolatile storage 3000 includes a change quality management DB 3001 formed of a change quality management table (Table 1).

TABLE 1

| IP ADDRESS OF RELAY DESTINATION TERMINAL | IMAGE DATA QUALITY (IMAGE QUALITY) TO BE RELAYED |
| --- | --- |
| 1.3.2.4 | HIGH IMAGE QUALITY |
| 1.3.1.3 | INTERMEDIATE IMAGE QUALITY |
| 1.3.2.3 | LOW IMAGE QUALITY |
| . . . | . . . |

The change quality management table is configured to manage an IP address of a terminal indicating a relay destination of the image data and image quality of the image data relayed by the terminal.

The transmitter-receiver 31 is configured to transmit to an external apparatus or receive from the external apparatus data via the communications network 2. Note that the transmitter-receiver 31 may be implemented, for example, by the network I/F 209 (FIG. 5) or the like.

The status detector 32 is configured to detect an operating status and the like of the relay apparatus 30. The operating status includes "online", "offline", "currently transmitting", "temporarily stopped", or the like. Note that the status detector 32 may be implemented, for example, by the CPU 201 (FIG. 5) or the like.

The data quality identifier 33 is configured to search the change quality management DB 3001, for example, by the IP address of the destination terminal as a search key. This search extracts the image quality of the image data to be relayed to identify the extracted image quality. Note that the data quality identifier 33 may be implemented, for example, by the CPU 201 (FIG. 5) or the like.

The print part 34 is configured to change the change quality management DB 3001 based on data indicating the quality received from the management system 50. For example, suppose that the conference is conducted between a request source terminal having the terminal ID "10*aa*" and a destination terminal having the terminal ID "10*db*" that mutually transmit or receive image data indicating high quality images. Note that the request source terminal is illustrated as the terminal 10*aa*, and the destination terminal is illustrated as the terminal 10*db* in FIG. 1.

Suppose also that in addition to the above-described TV conference, another TV conference is conducted between the terminal 10*bb* serving as a request source terminal and the terminal 10*ca* serving as a destination terminal. Each of the bandwidths available for use in transmitting and receiving data in two TV conferences may become narrower than the bandwidths available for use in transmitting and receiving data in one TV conference. As a result, receiving the image data may be delayed in the terminal 10*db*, for example. In such a case, the relay apparatus 30 may handle the delay by lowering the image quality of the relaying image data. For example, the relay apparatus 30 that has been transmitting or receiving the image data with high image quality may transmit or receive the image data with the intermediate image quality. Further, when the relay apparatus 30 lowers the image quality, the relay apparatus 30 changes the change quality management DB 3001 based on the data indicating the quality of image data transmitted or received with the intermediate quality. Note that the print part 34 may be implemented, for example, by the CPU 201 (FIG. 5) or the like.

The data quality changer 35 is configured to change an image quality of an image represented by the image data received from the request source terminal based on the change quality management DB 3001. Note that the data quality changer 35 may be implemented, for example, by the CPU 201 (FIG. 5) or the like.

The storage-reader 39 is configured to read data from or store data in the nonvolatile storage 3000. Note that the storing-reading processor 39 may be implemented, for example, by the HDD 205 (FIG. 5) or the like.

The management system 50 includes a transmitter-receiver 51, a terminal authenticator 52, a status manager 53, an extractor 54, a terminal status acquisition part 55, a primary selector 56, a session manager 57, a quality manager 58, a storing-reading processor 59, a delay time manager 60, and a nonvolatile storage 5000.

The nonvolatile storage 5000 includes a relay apparatus management DB 5001 formed of a relay apparatus management table (Table 2) noted below.

TABLE 2

| RELAY APPARATUS ID | OPERATING STATUS | RECEIVED DATE AND TIME | IP ADDRESS OF RELAY APPARATUS | MAXIMUM DATA TRANSMISSION RATE (Mbps) |
|---|---|---|---|---|
| 111a | ONLINE | NOV. 10, 2009 13:00 | 1.2.1.2 | 100 |
| 111b | ONLINE | NOV. 10, 2009 13:10 | 1.2.2.2 | 1000 |
| 111c | OFFLINE | NOV. 10, 2009 13:20 | 1.3.1.2 | 100 |
| 111d | ONLINE | NOV. 10, 2009 13:30 | 1.3.2.2 | 10 |

The relay apparatus management table is configured to manage an operating status of the relay apparatus, received date and time at which the management system 50 has received data indicating the operating status, an IP address of the relay apparatus, and the maximum data transmission rate of the relay apparatus, in association with the relay apparatus ID, for each of the relay apparatus IDs. For example, the relay apparatus having the relay apparatus ID "111a" indicates the operating status "online" in the relay apparatus management table. The received date and time, at which the management system 50 has received the data indicating the operating status of the relay apparatus 30 having the relay apparatus ID "111a", indicate "Nov. 10, 2009 13:00". The IP address of the relay apparatus 30 having the relay apparatus ID "111a" indicates "1.2.1.2". The maximum data transmission rate of the relay apparatus 30 having the relay apparatus ID "111a" indicates "100 Mbps".

The nonvolatile storage 5000 includes a terminal authentication management DB 5002 formed of a terminal authentication management table (Table 3) noted below.

TABLE 3

| TERMINAL ID | PASSWORD |
|---|---|
| 01aa | aaaa |
| 01ab | abab |
| 01ba | baba |
| ... | ... |

The terminal authentication management table is configured to manage a password in association with a terminal ID, for each of the terminal IDs. For example, the terminal ID of the terminal 10aa (FIG. 1) is "01aa", and a password "aaaa" is stored in association with the terminal ID "01aa" of the terminal 10aa in the terminal authentication management table.

The nonvolatile storage 5000 includes a terminal management DB 5003 formed of a terminal management table (Table 4) noted below.

TABLE 4

| TERMINAL ID | DESTINATION NAME | OPERATING STATUS | RECEIVED DATE AND TIME | IP ADDRESS OF TERMINAL | COMPATIBLE CODEC |
|---|---|---|---|---|---|
| 01aa | AA TERMINAL, TOKYO OFFICE, JAPAN | ONLINE (TRANSMISSION AVAILABLE) | NOV. 10, 2009 13:40 | 1.2.1.3 | H264, H265 |
| 01ab | AB TERMINAL, TOKYO OFFICE, JAPAN | OFFLINE | NOV. 9, 2009 12:00 | 1.2.1.4 | H264 |
| ... | ... | ... | ... | ... | ... |
| 01ba | BA TERMINAL, OSAKA OFFICE, JAPAN | ONLINE (TEMPORARILY STOPPED) | NOV. 10, 2009 13:45 | 1.2.2.3 | H264, H265 |
| 01bb | BB TERMINAL, OSAKA OFFICE, JAPAN | ONLINE (TRANSMISSION AVAILABLE) | NOV. 10, 2009 13:50 | 1.2.2.4 | H264 |
| ... | ... | ... | ... | ... | ... |
| 01ca | CA TERMINAL, NY OFFICE, USA | OFFLINE | NOV. 10, 2009 12:45 | 1.3.1.3 | H264, H265 |
| 01cb | CB TERMINAL, NY OFFICE, USA | ONLINE (CURRENTLY TRANSMITTING) | NOV. 10, 2009 13:55 | 1.3.1.4 | H265 |
| ... | ... | ... | ... | ... | ... |
| 01da | DA TERMINAL, WASHINGTON, D.C OFFICE, USA | ONLINE (CURRENTLY TRANSMITTING) | NOV. 8, 2009 12:45 | 1.3.2.3 | H264, H265 |
| 01db | DB TERMINAL, WASHINGTON, D.C OFFICE, USA | OFFLINE | NOV. 10, 2009 12:45 | 1.3.2.4 | H265 |
| ... | ... | ... | ... | ... | ... |

The terminal management table is configured to manage a destination name, a terminal status, an IP address, a codec accessible by the terminal, and date and time at which the management system 50 has received data indicating these items in association with the terminal ID, for each of the terminal IDs. For example, the terminal ID of the terminal 10aa (FIG. 1) is "01aa", and the IP address "1.2.1.3" is stored in association with the terminal ID "01aa" of the terminal 10aa in the terminal management table. In addition, the destination name of the terminal 10aa being "AA terminal, TOKYO OFFICE, JAPAN" is stored in association with the terminal ID "01aa" of the terminal 10aa in the terminal management table. Further, the operating status of the terminal 10aa being "online (transmission available)" is stored in association with the terminal ID "01aa" of the terminal 10aa in the terminal management table. Moreover, the compatible codecs of the terminal 10aa including "H264" and "H265" are stored in association with the terminal ID "01aa" of the terminal 10aa in the terminal management table. The data indicating the above items being received at "Nov. 10, 2009 13:40" are stored in association with the terminal ID "01aa" of the terminal. 10aa in the terminal management table.

The nonvolatile storage 5000 includes a destination list management DB 5004 formed of a destination list management table (Table 5) noted below.

TABLE 5

| REQUEST SOURCE TERMINAL ID | DESTINATION TERMINAL ID |
|---|---|
| 01aa | 01ab, . . . , 01ba, 01bb, . . . , 01ca, 01cb, 01da, 01db, . . . |
| 01ab | 01aa, 01ca, 01cb |
| 01ba | 01aa, 01ab, 01ca, 01cb, 01da, 01db |
| . . . | . . . |
| 01db | 01aa, 01ab, . . . , 01ba, 01bb, . . . , 01ca, 01cb, . . . , 01da |

The destination list management table is configured to manage the terminal IDs of the destination terminals in the corresponding TV conference in association with the terminal ID of the request source terminal, for each of the request source terminals. For example, the request source terminal having the terminal ID "01aa" may determine the terminal having the terminal ID "01ab" as the destination terminal. The destination terminal candidates may thus be stored in association with the request source terminals in the destination list management table. The management system 50 that receives a request for adding or deleting the destination terminal candidates updates the destination list management table by adding terminals as destination terminal candidates or deleting the terminals from the destination list management table.

The nonvolatile storage 5000 includes a session management DB 5005 formed of a session management table (Table 6) noted below.

TABLE 6

| SELECTION SESSION ID | RELAY APPARATUS ID | REQUEST SOURCE TERMINAL ID | DESTINATION TERMINAL ID | DELAY TIME (ms) | RECEIVED DATE AND TIME |
|---|---|---|---|---|---|
| se1 | 111a | 01aa | 01db | 200 | NOV. 10, 2009 14:00 |
| se2 | 111b | 01ba | 01ca | 50 | NOV. 10, 2009 14:10 |
| se3 | 111d | 01bb | 01da | 400 | NOV. 10, 2009 14:20 |
| . . . | . . . | . . . | . . . | . . . | . . . |

The session management table is configured to manage a session for selecting the relay apparatus in association with the selection session ID, for each of the selection session IDs. The session management table manages the relay apparatus ID, the terminal ID of the request source terminal, the terminal ID of the destination terminal, delay time, and received date and time at which the management system 50 has received data indicating these items. For example, the relay apparatus selected by the session having the selection session ID "se1" is stored in association with the relay apparatus ID "111a" in the session management table. The relay apparatus 30 having the relay apparatus ID "111a" relays the image data, the audio data, and the like between the request source terminal having the terminal ID "01aa" and the destination terminal having the terminal ID "01db". The delay time of the data received by the destination terminal at "Nov. 10, 2009, 14:00" is "200 ms". Note that in a case where the TV conference is conducted between the two terminals, the delay time and the like may be managed by the request source terminal instead of the destination terminal. However, in a case where the TV conference is conducted between the three or more terminals, the delay time is managed based on data transmitted from the received terminal.

The nonvolatile storage 5000 includes a priority management DB 5006 formed of an address priority management table (Table 7) and a transmission rate priority management table (Table 8) noted below.

TABLE 7

| SAME OR DIFFERENCE IN DOT ADDRESS | ADDRESS PRIORITY |
|---|---|
| SAME.SAME.SAME.DIFFERENT | 5 |
| SAME.SAME.DIFFERENT.— | 3 |
| SAME.DIFFERENT.—.— | 1 |
| DIFFERENT.—.—.— | 0 |

The address priority management table is configured to manage the same or the difference of four decimal numbers forming the dot address in association with the address priority. Note that the IP address is a sequence of four decimal numbers separated by dots, and each decimal number indicates the binary value of one of four bytes. According to the address priority management table, the address priority becomes higher as the number of same decimal numbers (four address portions of the IP address) in the IP address increases. In the address priority management table illustrated in Table 7, "same" indicates the same decimal numbers (address portion) of the IP address whereas "different" indicates the different decimal numbers of the IP address. For example, when the three digits from the highest order digit of the dot address are the same, the address priority is "5". When the two digits from the highest order digit of the dot address are the same, the address priority is "3". When the highest order digit of the dot address is the same, the address priority is "1". When the highest order digit of the dot address is different, the address priority is "0". Note that in the address priority management table illustrated above (Table 7), "-" indicates the address portion unassociated with the address priority management.

TABLE 8

| MAXIMUM DATA TRANSMISSION RATE IN RELAY APPARATUS (Mbps) | TRANSMISSION RATE PRIORITY |
|---|---|
| 1000~ | 5 |
| 100~1000 | 3 |
| 10~100 | 1 |
| ~10 | 0 |

Figure 8:
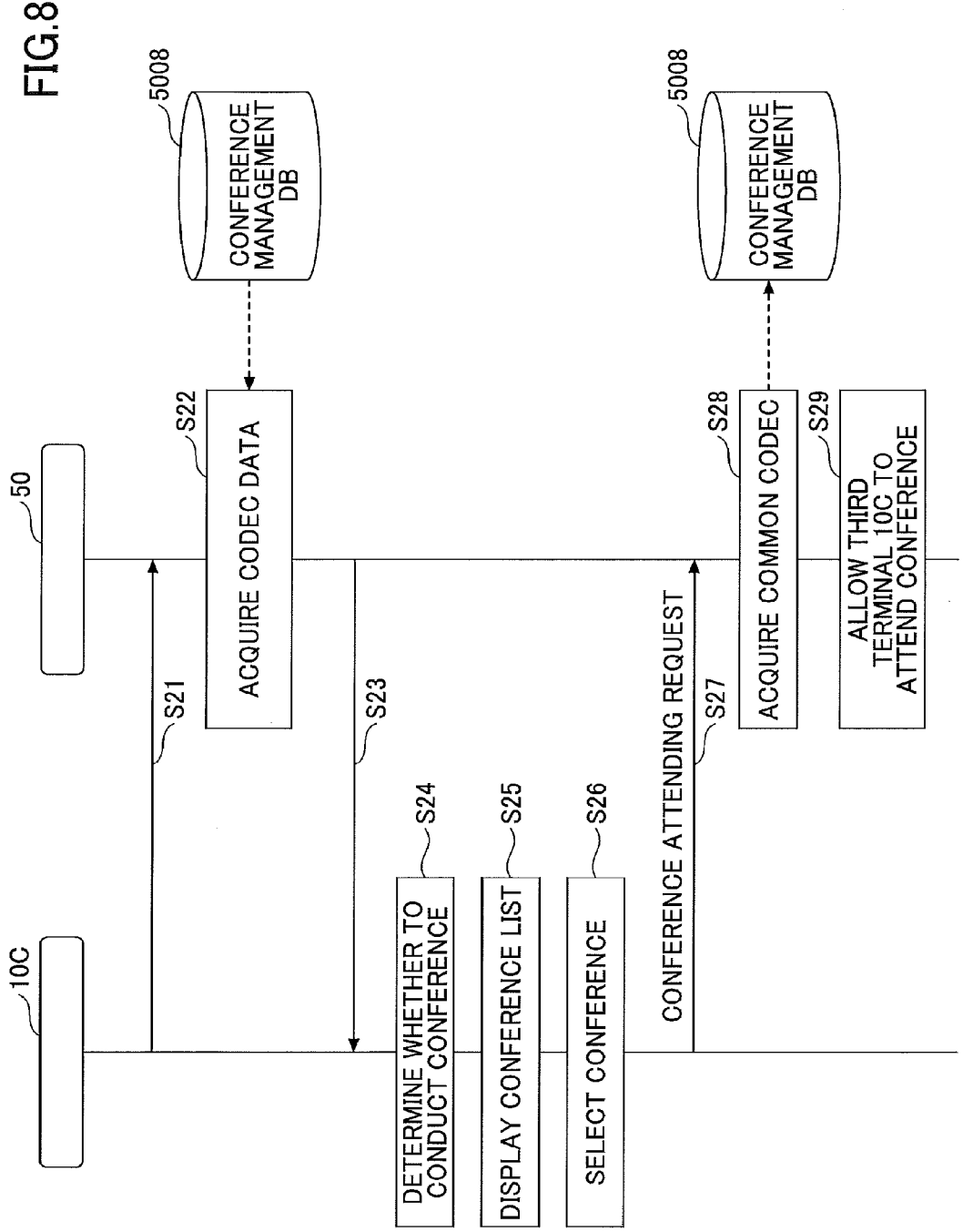
FIG. 8 is a sequence diagram illustrating a second example of an overall process performed by the information processing system according to an embodiment.

FIG. 8 depicts a transmission rate priority management table. The transmission rate priority management table is configured to manage the maximum transmission rate in the relay apparatus in association with the transmission rate priority. According to the transmission rate priority management table illustrated above (Table 8), the transmission rate priority becomes higher as the maximum data transmission rate increases. For example, when the maximum data transmission rate in the relay apparatus is "1000 Mbps or above", the transmission rate priority is "5". When the maximum data transmission rate in the relay apparatus is "100 to 1000 Mbps", the transmission rate priority is "3". When the maximum data transmission rate in the relay apparatus is "10 to 100 Mbps", the transmission rate priority is "1". When the maximum data transmission rate in the relay apparatus is "lower than 10 Mbps", the transmission rate priority is "0".

The nonvolatile storage 5000 includes a quality management DB 5007 formed of a quality management table (Table 9) noted below.

TABLE 9

| DELAY TIME (ms) | RELAYED IMAGE DATA QUALITY (QUALITY OF IMAGE) |
|---|---|
| 0~100 | HIGH IMAGE QUALITY |
| 100~300 | INTERMEDIATE IMAGE QUALITY |
| 300~500 | LOW IMAGE QUALITY |
| 500~ | (INTERRUPTED) |

The quality management table is configured to manage the delay time in association with the quality of the image data. According to the quality management table illustrated above (Table 9), the quality of images becomes lower as the delay time increases. Specifically, the relay apparatus degrades the quality of images as the delay time becomes longer.

The nonvolatile storage 5000 includes a quality management DB 5008 formed of a conference management table (Table 10) noted below.

TABLE 10

| CONFERENCE ID | CONFERENCE ATTENDING TERMINAL ID | COMPATIBLE CODEC | COMMON CODEC | CODEC IN USE |
|---|---|---|---|---|
| Conf01 | 01aa 01bb | H264, H265 H264 | H264 | H264 |
| Conf02 | 01ba | H264, H265 | H264, H265 | H265 |
| Conf03 | 01ca 01cb | H264, H265 H265 | H265 | H265 |
| Conf04 | 01da 01ba | H264, H265 H264, H265 | H264, H265 | H265 |
| ... | ... | ... | ... | ... |

The conference management table is configured to manage the "conference ID" assigned to each of the TV conferences in association with a "conference attending terminal ID" of each of the terminals that attends a conference, a "compatible codec" indicating codec(s) capable of being used by each of the conference attending terminals, a "common codec" indicating codec(s) capable of being used by all the conference attending terminals, and a "codec in use" indicating a codec currently used in the conference. The conference management table is updated every time a conference starts or an attendee of the conference attends or quits a conference.

Overall Process Example

Figure 7:
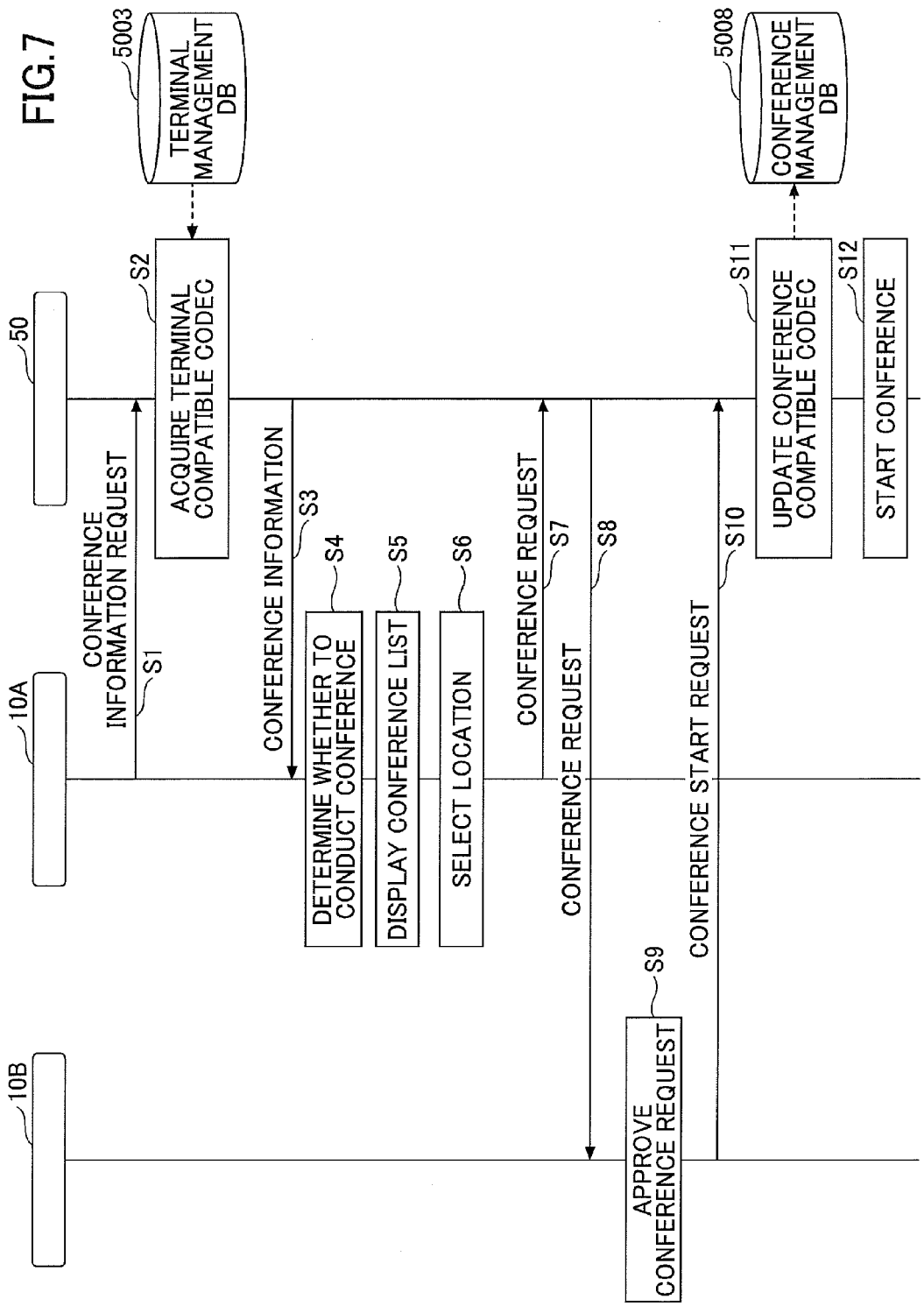
FIG. 7 is a sequence diagram illustrating a first example of an overall process performed by the information processing system according to an embodiment.

FIG. 7 is a sequence diagram illustrating a first example of an overall process performed by the information processing system according to an embodiment. The overall process illustrated in FIG. 7 includes displaying an image screen of a list of conferences (hereinafter simply called "a conference list") and the like before starting a conference between a first terminal 10A serving as an example of the first information processing terminal and a second terminal 10B serving as an example of the second information processing terminal. Note that it is assumed that the first terminal 10A and the second terminal 10B are both online.

In step S1, the first terminal 10A transmits a conference information request for requesting conference information to the management system 50 so that the management system 50 transmits the conference information including statuses of the registered conferences.

In step S2, the management system 50 acquires data indicating codecs from the terminal management DB 5003 via the extractor 54 (see FIG. 6) or the like.

In step S3, the management system 50 transmits conference information and the like to the first terminal 10A.

In step S4, the first terminal 10A determines whether it is possible to perform a conference with another terminal, based on the received conference information and the like.

In step S5, the first terminal 10A displays a conference list and the like, based on a determined result and the like in step S4.

In step S6, the first terminal 10A inputs an operation of a user to select a location.

In step S7, the first terminal 10A transmits a conference request to the management system 50.

In step S8, the management system 50 transmits a conference request to the second terminal 10B, based on the received conference request of the first terminal 10A.

In step S9, the second terminal 10B approves the received conference request.

In step S10, the second terminal 10B that has approved the conference request transmits a conference start request for starting a conference with the first terminal 10A to the management system 50.

In step S11, the management system 50 updates the "codec in use" that is the codec used in the conference via the status manager 53 (FIG. 6) or the like, based on the "common codec" capable of being used by both the first terminal 10A and the second terminal 10B.

In step S12, the management system 50 starts the conference.

FIG. 8 is a sequence diagram illustrating a second example of an overall process performed by the information processing system according to an embodiment. The overall process illustrated in FIG. 8 may be achieved via the overall process illustrated in FIG. 7 to allow an additional terminal (hereinafter called a "third terminal 10C") to attend the conference that has been established between the first terminal 10A and the second terminal 10B.

In step S21, the third terminal 10C transmits to the management system 50 a data request for displaying a conference list including conference information and the like presenting statuses of the registered conferences.

In step S22, the management system 50 acquires data relating to codecs including the "common codec", the "codec in use", and the like illustrated in Table 10 via the extractor 54 (FIG. 6) from the terminal management DB 5003 and the like.

In step S23, the management system 50 transmits conference information and the like to the third terminal 10C.

In step S24, the third terminal 10C determines whether to perform a conference with other terminals, based on the conference information and the like.

In step S25, the third terminal 10C displays a conference list and the like, based on a determined result and the like in step S24.

In step S26, the third terminal 10C inputs an operation made by the user to select a conference.

In step S27, the third terminal 10C transmits a conference attending request for attending the conference to the management system 50.

In step S28, the management system 50 updates the "codec in use" determined based on the "common codec" capable of being used by all the information processing terminals that attend the conference.

In step S29, the management system 50 allows the third terminal 10C to attend the conference.

Note that the management system 50 may allow the information processing terminal to quit the conference after the overall process illustrated in FIG. 8 ends.

Figure 9:
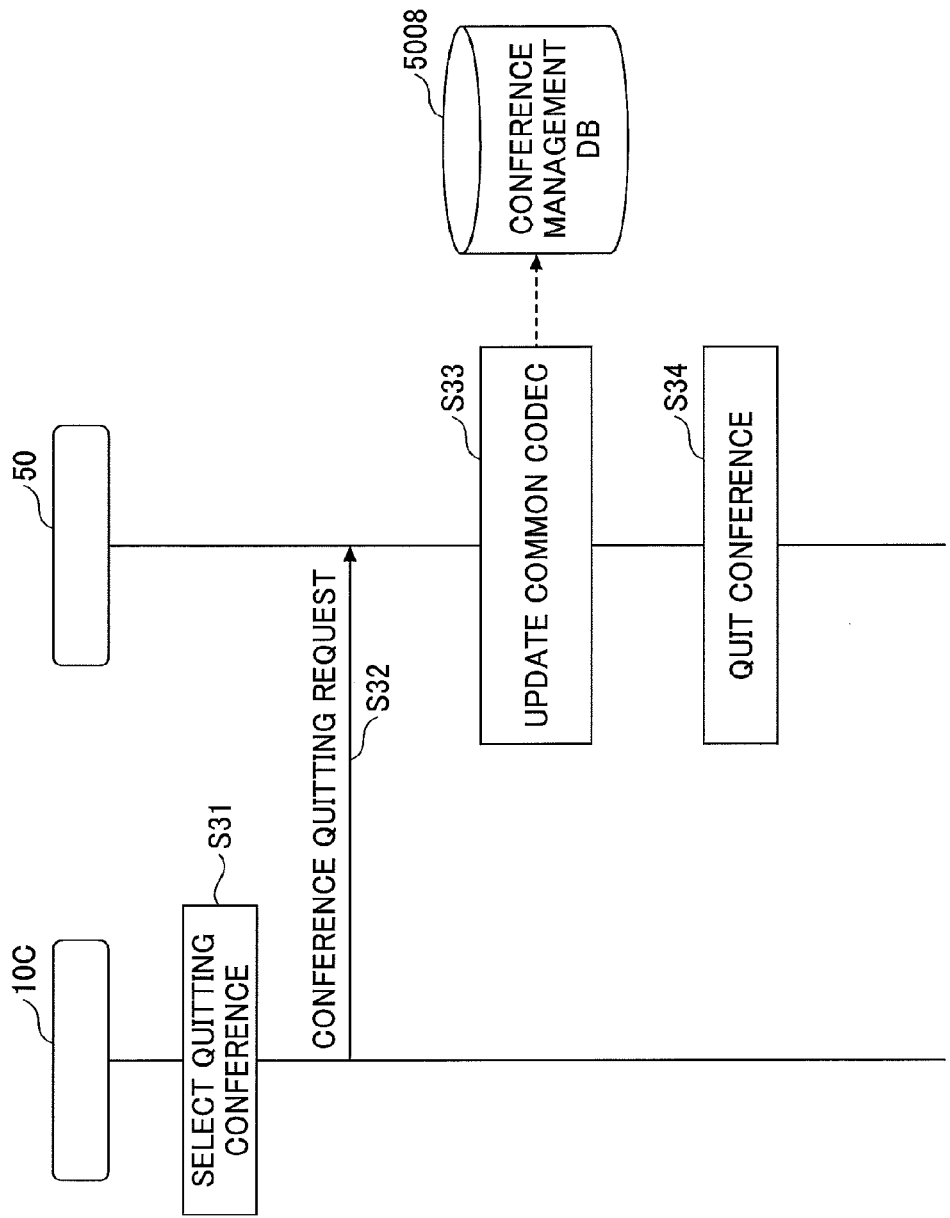
FIG. 9 is a sequence diagram illustrating a third example of an overall process performed by the information processing system according to an embodiment.

FIG. 9 is a sequence diagram illustrating a third example of an overall process performed by the information processing system according to an embodiment. The overall process illustrated in FIG. 9 is an example of a process of allowing the third terminal 10C to quit the conference that has been established via the process illustrated in FIG. 8 between the first terminal 10A (first information processing terminal), the second terminal 10B (second information processing terminal), and the third terminal 10C (third information processing terminal).

In step S31, the third terminal 10C inputs an operation performed by the user to select quitting the conference.

In step S32, the third terminal 10C transmits a conference quitting request for quitting the conference to the management system 50.

In step S33, the management system 50 causes the status manager 53 (see FIG. 6) or the like to update the "codec in use" based on the "common codec" capable of being used by both the first terminal 10A and the second terminal 10B.

In step S34, the management system 50 allows the third terminal 10C to quit the conference.

In addition, the following process may be performed by the relay apparatus 30 or the like after step S11 illustrated in FIG. 7 is performed.

Figure 10:
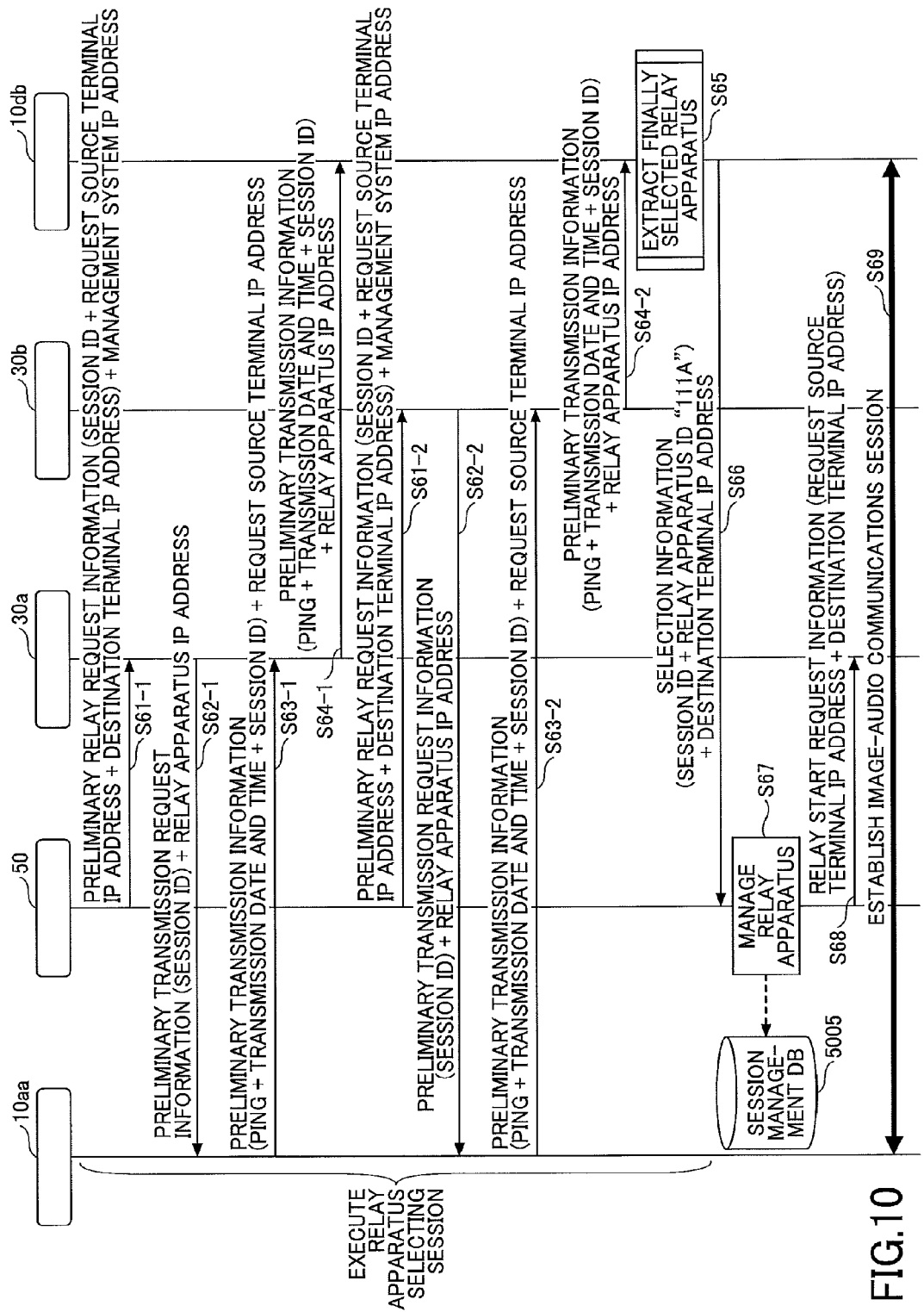
FIG. 10 is a sequence diagram illustrating an example of a process performed by a relay apparatus or the like in the information processing system according to an embodiment.

FIG. 10 is a sequence diagram illustrating an example of a process performed by a relay apparatus 30 or the like in the information processing system according to an embodiment. Note that the example of the process illustrated in FIG. 10 includes transmitting or receiving various types of management information via the management information sessions sei illustrated in FIG. 2 or the like.

In steps S61-1 and S61-2, the management system 50 transmits preliminary relay request information illustrating indication to preliminarily request each of the relay apparatuses (30a and 30b) selected in the relay apparatus selecting process to perform a relay process before starting the TV conference. The preliminary relay request information includes a session ID "se1", an IP address "1.2.1.3" of the request source terminal (the terminal 10aa) and an IP address "1.3.2.4" of the destination terminal (the terminal 10db). The preliminary relay request information allows the relay apparatuses (30a and 30b) to detect an appropriate one of the selection sessions, an appropriate terminal serving as the request source terminal, and an appropriate terminal serving as the destination terminal. In addition, the relay apparatuses (30a and 30b) may be able to detect the IP address "1.1.1.2" of the management system 50 serving as a transmission source of the preliminary relay request information.

In steps S62-1 and 62-2, the relay apparatuses (30a and 30b) transmit preliminary transmission request information from the respective transmitter-receivers 31 to the detected request source terminal (the terminal 10aa) via the communications network 2. The preliminary transmission request information includes indication to transmit the preliminary transmission information including a later-described "ping" (i.e., Packet Internet Groper). Similarly, the relay apparatuses (30a and 30b) also transmit the preliminary transmission request information to the relay apparatuses (30a and 30b) themselves before the TV conference starts. The preliminary transmission information includes the session ID "se1". Based on the preliminary transmission information having the session ID "se1", the request source terminal (the terminal 10aa) may be able to detect the transmission of the preliminary transmission information to the relay apparatuses (30a and 30b) in the process of selecting the relay apparatus 30 executed in the session of the session ID "se1". Simultaneously, the request source terminal (the terminal 10aa) may be able to detect respective IP addresses ("1.2.1.2" and "1.2.2.2") of the relay apparatuses (30a and 30b) serving as transmission sources of the preliminary transmission request information.

Note that the management system 50 does not directly report the IP address of the destination terminal (the terminal 10db) to the request source terminal (the terminal 10aa). The management system 50 may, for example, report the IP address of the destination terminal (the terminal 10db) to the relay apparatus 30a as illustrated in step S61-1. The management system 50 requests the relay apparatus 30b to transmit the preliminary transmission request information to the request source terminal (the terminal 10aa) as illustrated in step S61-2. Steps 61-1 and 61-2 are performed in order to ensure security by not allowing the terminals 10aa and 10db to detect the IP address of another terminal 10.

In steps S63-1 and 63-2, the request source terminal (the terminal 10aa) transmits the preliminary transmission information from the transmitter-receivers 31 to the respective relay apparatuses (30a and 30b) via the communications network 2. The preliminary transmission information is transmitted to the request source terminal (the terminal 10aa) via the respective relay apparatuses (30a and 30b) before transmission of the image data and the audio data.

The transmission of the preliminary transmission information enables measuring a time required between the transmission of the preliminary transmission information by the request source terminal (the terminal 10aa) and the reception of the preliminary transmission information by the destination terminal (the terminal 10db). The preliminary transmission information includes "ping" or pinging for ensuring coupling the request source terminal (the terminal 10aa), the relay apparatuses (30a and 30b), and the destination terminal (the terminal 10db) to mutually have communications. The preliminary transmission information further includes the session ID "se1" and the transmitted date and time at which the preliminary transmission information is transmitted from the request source terminal (the terminal 10aa).

The relay apparatuses (30a and 30b) may be able to detect that the preliminary transmission information is transmitted by the execution of the session having the selection session ID "se1". Simultaneously, the relay apparatuses (30a and 30b) may be able to detect the IP address "1.2.1.3" of the request source terminal (the terminal 10aa) serving as a transmission source of the preliminary transmission information.

In steps S64-1 and S64-2, the relay apparatuses (30a and 30b) relay the preliminary transmission information to the IP address of the destination terminal (the terminal 10db) included in the received preliminary relay request information. The destination terminal (the terminal 10db) may be able to detect that the preliminary transmission information is transmitted by the execution of the session having the selection session ID "se1". Simultaneously, the destination terminal (the terminal 10db) may be able to detect the IP addresses ("1.2.1.2" and "1.2.2.2") of the relay apparatuses (30a and 30b) serving as transmission sources (relaying sources) of the preliminary transmission information.

In step S65, the final selector 17 of the destination terminal (the terminal 10db) finally selects one of the relay apparatuses 30 to relay image data and audio data in the TV conference based on the preliminary transmission information.

Figure 11:
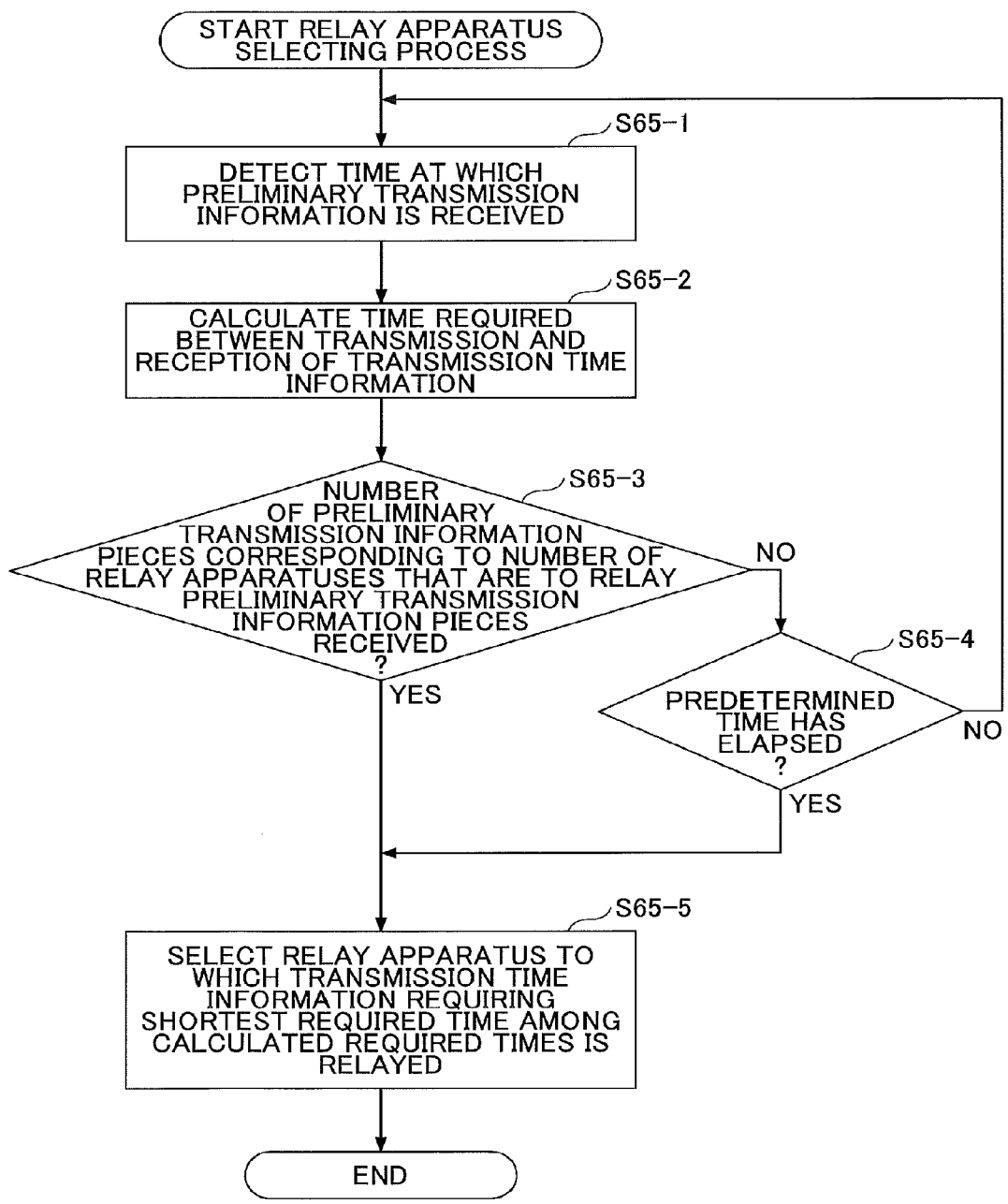
FIG. 11 is a flowchart illustrating an example of a relay apparatus selecting process performed by a relay apparatus or the like in the information processing system according to an embodiment.

FIG. 11 is a flowchart illustrating an example of a relay apparatus selecting process performed by a relay apparatus or the like in the information processing system according to an embodiment. Step S65 illustrated in FIG. 10 may include the relay apparatus selecting process illustrated in FIG. 11.

In step S65-1, a measuring part of the final selector 17 detects received date and time at which the preliminary transmission information relayed from each of the relay apparatuses 30 is received by a receiver of the destination terminal (the terminal 10db) (see FIG. 10).

In step S65-2, a calculating part of the final selector 17 calculates time required between the transmission and the reception of the preliminary transmission information based on the difference between the reception time and the transmission time of the preliminary transmission information included in the corresponding preliminary transmission information, for each preliminary transmission information.

In step S65-3, a final selector determines whether all the preliminary transmission information pieces, the number of which corresponds to the number of relay apparatuses of "2" that relay the respective preliminary transmission information pieces, are received in the execution of the session having the session ID "se1".

In step S65-4, when the final selector determines that not all the preliminary transmission information pieces have been received (NO in step S65-3), the final selector determines whether a predetermined time (one minute in this example) has elapsed from the reception of the preliminary transmission information by the destination terminal (the terminal 10db). When the final selector determines that the predetermined time has not elapsed from the reception of the preliminary transmission information (NO in step S65-4), the final selector returns to step S65-1. When the final selector determines that all the preliminary transmission information pieces are received (YES in step S65-3) or that the predetermined time has elapsed from the reception of the preliminary transmission information (YES in step S65-4), the final selector proceeds with step S65-5.

In step S65-5, the final selector selects one of the relay apparatuses that has performed a relaying process within a shortest required time of all the required times. This embodiment represents an example of selecting the relay apparatus 30a, based on the assumption in which the required time for the preliminary transmission information relayed by the relay apparatus 30a is shorter than the required time for the preliminary transmission information relayed by the relay apparatus 30b.

Referring back to FIG. 10, in step S66, the destination terminal (the terminal 10db) transmits indication that the relay apparatus 30a has been selected (hereinafter called "selection information") to the management system 50 from the transmitter-receiver 31 via the communications network 2. The selection information includes the session ID "se1" and the relay apparatus ID "111a" of the selected relay apparatus 30a. The management system 50 may thus be able to detect that the relay apparatus 30a has been selected in the execution of the session having the session ID "se1". Simultaneously, the management system 50 may be able to detect the IP address "1.3.2.4" of the destination terminal (the terminal 10db) serving as a transmission source of the selection information.

In step S67, the session manager 57 of the management system 50 stores and manages the relay apparatus ID "111a" of the selected relay apparatus 30a. Note that the relay apparatus ID is stored in a relay apparatus ID field of the record having the session ID "se1" in the session management table of the session management DB 5005 (FIG. 6).

In step S68, the transmitter-receiver 51 of the management system 50 transmits relay start request information indicating a relay start request for starting the relay to the relay apparatus 30a via the communications network 2. The relay start request information include the IP address "1.2.1.3" of the request source terminal (the terminal 10aa) to be relayed and the TP address "1.3.2.4" of the destination terminal (the terminal 10db).

In step S69, the relay apparatus 30a establishes a session for communicating image data of three different resolutions (low, intermediate and high resolutions) and audio data between the terminals 10aa and 10db. Having established the session, the terminals 10aa and 120db may be able to start a TV conference.

Note that the transmission source and the reception source may be switched between the request source terminal (the terminal 10aa) and destination terminal (the terminal 10db) after the relay apparatus selecting information has been transmitted by the management system 50 to the request source terminal (the terminal 10aa). The request source terminal (the terminal 10aa) may thus be able to perform the relay apparatus selecting process and transmission of selection information.

The following illustrates a process performed in the process of allowing a new information processing terminal to attend the conference currently in progress illustrated in FIG. 8.

Figure 12:
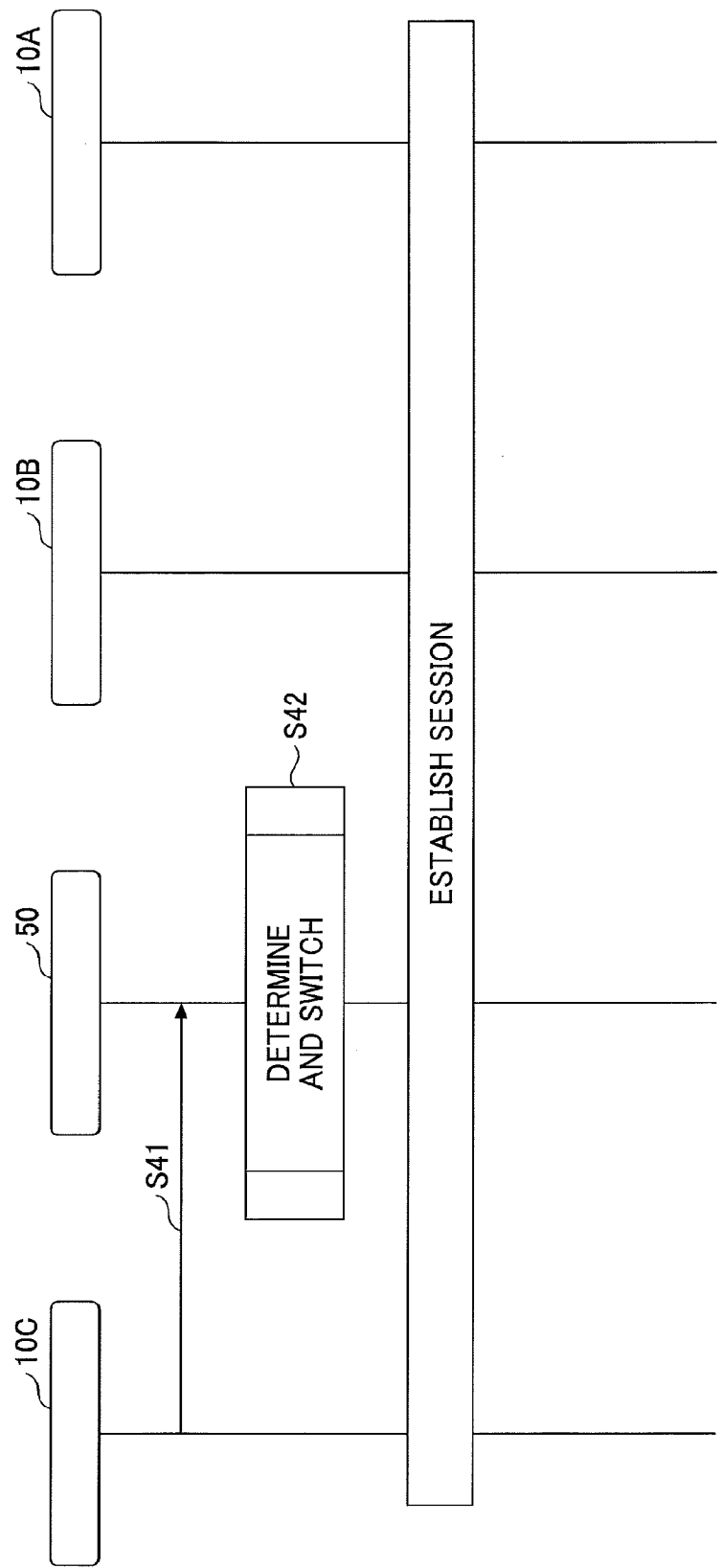
FIG. 12 is a sequence diagram illustrating an example of a determining and switching process performed by the information processing system according to the embodiment.

FIG. 12 is a sequence diagram illustrating an example of a determining and switching process performed by the information processing system according to the embodiment. The following illustration is given on the basis of the assumption in which the third terminal 10C serving as an example of a new third information processing apparatus attends the communications (i.e., a conference) already being performed between the first terminal 10A serving as an example of the first information processing terminal and the second terminal 10B serving as an example of the second information processing terminal. In the following example, it is assumed that the conference that is already being performed between the first terminal 10A and the second terminal 10B has the conference ID "Conf04" illustrated in Table 10. The codec that is capable of being used by the third terminal 10C is assumed to be a codec "H264".

In step S41, the third terminal 10C transmits a conference start request corresponding to the conference ID "Conf04"

to the management system 50. Note that the third terminal 10C may also transmit the conference start request using the codec "H264" in step S41.

In step S42, the management system 50 performs a determining and switching process.

Figure 13:
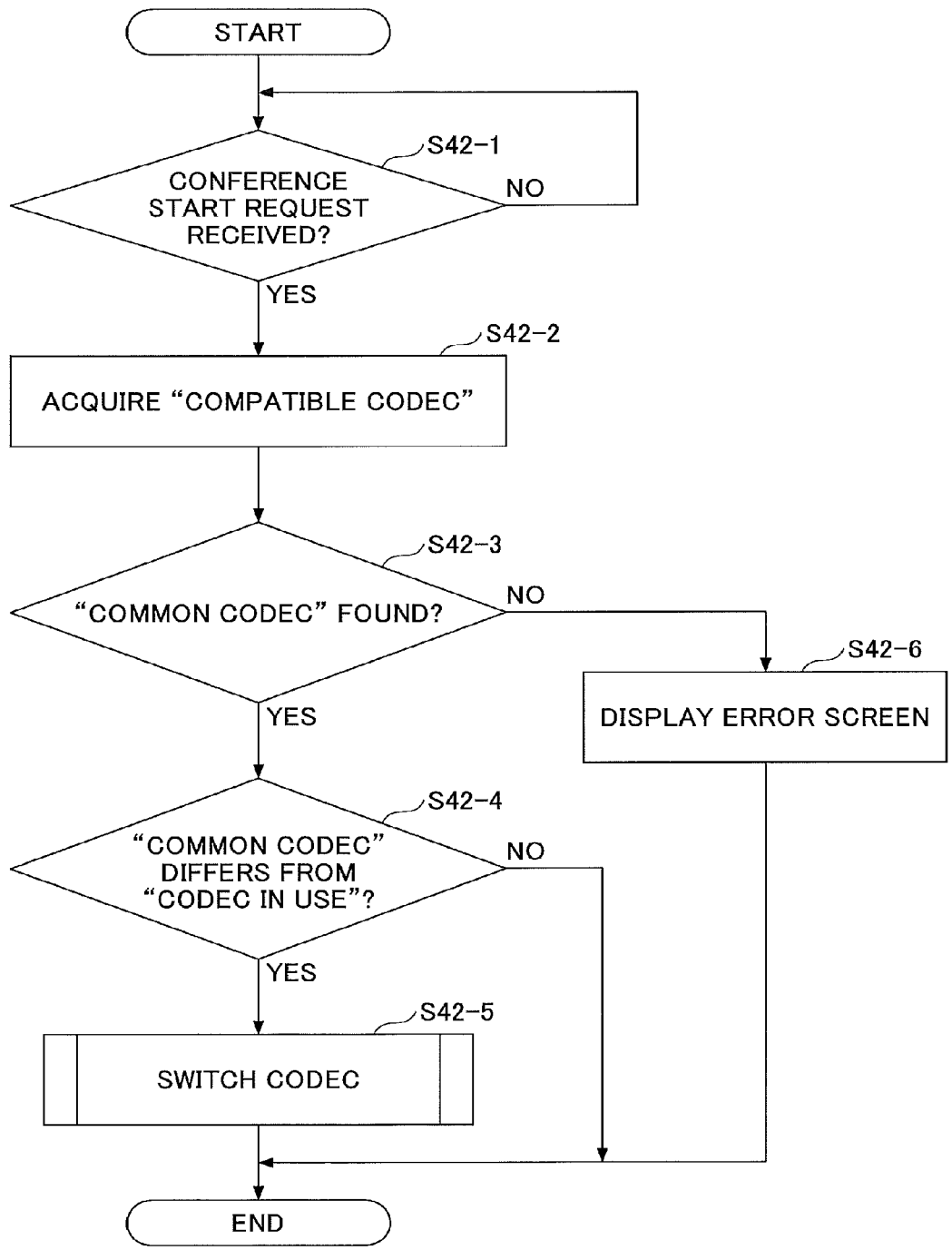
FIG. 13 is a flowchart illustrating an example of an example of a determining and switching process performed by the information processing system according to the embodiment.

FIG. 13 is a flowchart illustrating an example of a determining and switching process performed by the information processing system according to the embodiment. Step S42 illustrated in FIG. 12 may include the process illustrated in FIG. 13.

In step S42-1, the information processing system determines whether the management system 50 has received the conference start request. For example, when step S41 illustrated in FIG. 12 is performed, the information processing system determines that the conference start request transmitted from the third terminal 10C has been received. Subsequently, when the information processing system determines that the conference start request transmitted from the third terminal 10C has been received (YES in step S42-1), the information processing system proceeds with step S42-2. On the other hand, when the information processing system determines that the third terminal 10C has not transmitted the conference start request (NO in step S42-1), the information processing system performs step S42-1 again.

In step S42-2, the information processing system acquires "compatible codec(s)". For example, the information processing system acquires a codec or codecs recorded in the "compatible codec" field illustrated in Table 10. In this example, the information processing system acquires the compatible codecs "H264" and "H265" input into the "compatible codec" field corresponding to the conference TD "Conf04" in Table 10.

In step S42-3, the information processing system determines whether there is a "common codec" that is a codec common between the conference attending terminals. Specifically, the information processing system determines whether the compatible codecs acquired in step S42-2 include a compatible codec that is capable of being used by the terminal that has transmitted the conference start request (the third terminal 10C in this example). In this example, the acquired compatible codecs corresponding to the conference ID "Conf04" are "H264" and "H265" (see Table 10), and the compatible codec for the third terminal 10C (FIG. 12) that has transmitted the conference start request is the codec "H264". Hence, the information processing system determines that there is a "common codec" (YES in step S42-3). Specifically, the information processing system detects a common codec ("H264" in this case) used by all the terminals (e.g., the terminals having terminal IDs "01*da*" and "01*ba*" in Table 10) and the third terminal 10C that attend the conference.

When the information processing system determines that there is a "common codec" (YES in step S42-3), the information processing system subsequently proceeds with step S42-4.

On the other hand, when the information processing system determines that there is no common codec (NO in step S42-3), the information processing system proceeds with step S42-6. In step S42-6, the information processing system displays an error screen or the like.

In step S42-4, the information processing system determines whether the "common codec" differs from the "codec in use" (see Table 10). Specifically, in step S42-4, the information processing system compares the codec capable of being used by the third terminal 10C and the codec currently used by the terminals (terminal IDs 01*da* and 01*ba* in this case) in the conference having the conference ID "Conf04" (see Table 10), and determines whether the codec capable of being used by the third terminal 10C matches the codec currently used in the conference having the conference ID "Conf04" (e.g., "H265" in "codec in use" corresponding to "Conf04" in Table 10).

Figure 14:
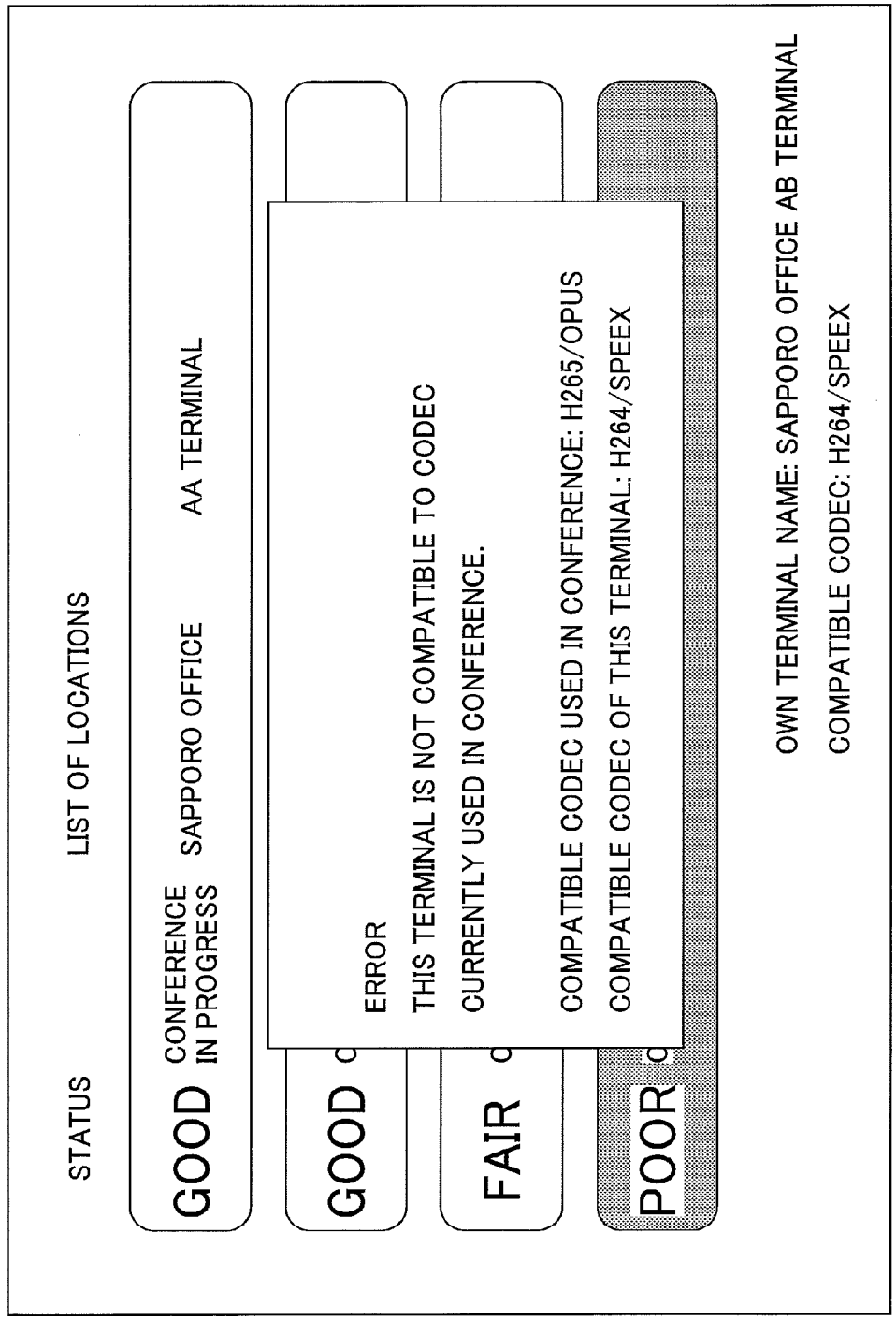
FIG. 14 is a diagram illustrating an example of an error screen displayed by the information processing system according to the embodiment.

FIG. 14 is a diagram illustrating an example of an error screen displayed by the information processing system according to the embodiment. The information processing system may display the screen depicted in FIG. 14, for example.

Referring back to FIG. 13, when the information processing system determines that the "common codec" differs from the "codec in use" (YES in step S42-4), the information processing system proceeds with step S42-5. On the other hand, when the information processing system determines that the "common codec" does not differ from the "codec in use" (NO in step S42-4), the information processing system ends the process of FIG. 13.

When the information processing system determines that the "common codec" does not differ from the "codec in use"; that is, when the information processing system determines that the "common codec" is the same as the "codec in use", information processing system allows the third terminal 10C to attend the conference using the "codec in use" currently used by the other terminals in the conference.

On the other hand, when the information processing system determines that the "common codec" differs from the "codec in use", the information processing system proceeds with step S42-5.

In step S42-5, the information processing system switches the "codec in use" currently used by the other terminals into the codec capable of being used by the third terminal 10C.

Figure 15:
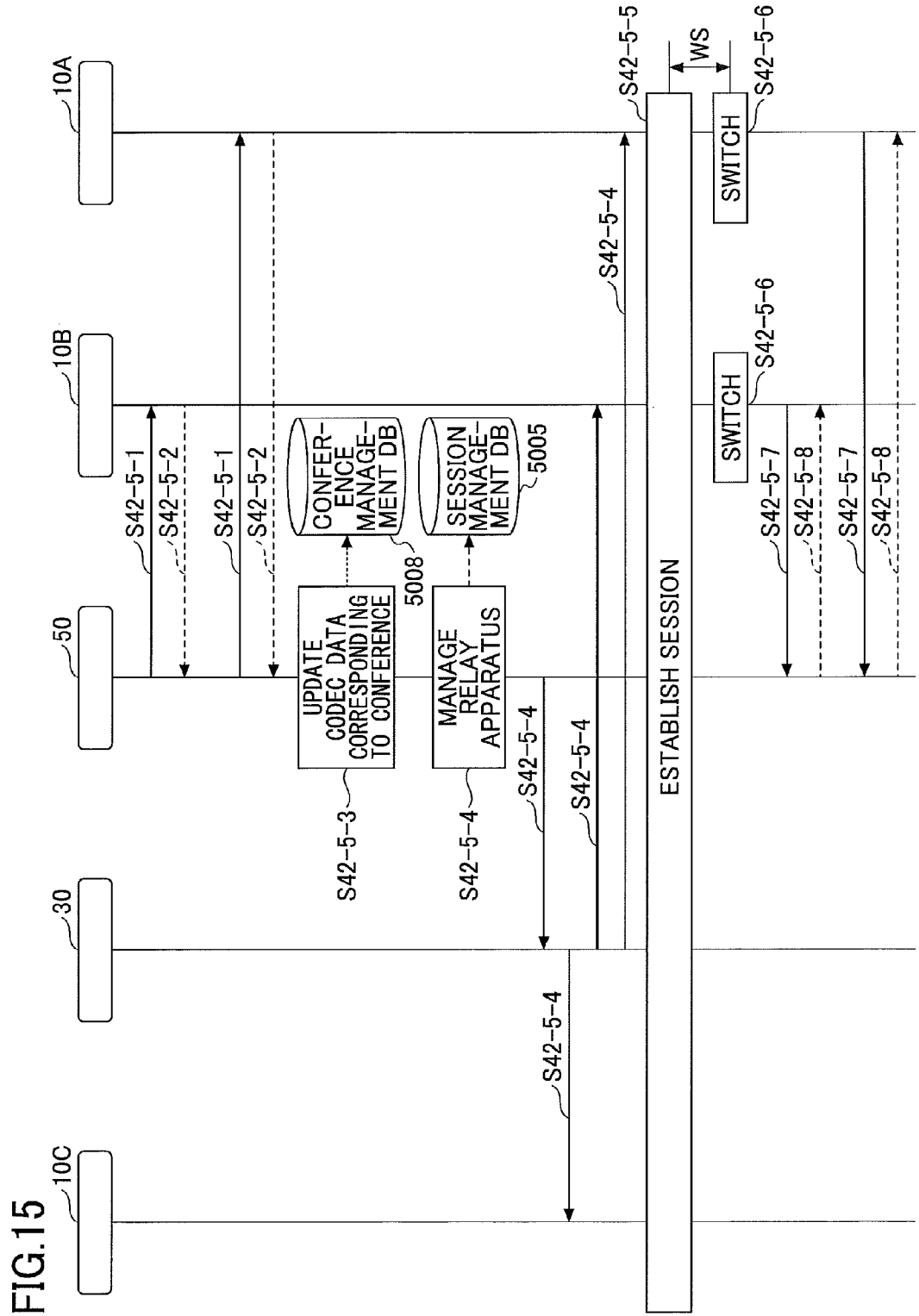
FIG. 15 is a sequence diagram illustrating an example of a switching process performed by the information processing system according to the embodiment.

FIG. 15 is a sequence diagram illustrating an example of a switching process performed by the information processing system according to the embodiment. The following process in FIG. 15 is illustrated by an example in which the "codec in use" currently used by the first terminal 10A and the second terminal 10B is "H265", and this "codec in use" of "H265" is switched into "H264" by the process illustrated in FIG. 13.

In step S42-5-1, the management system 50 transmits a codec switching request for switching a codec. In this example, the management system 50 transmits the codec switching request to each of the first terminal 10A and the second terminal 10B to switch the codec from "H265" to "H264".

In step S42-5-2, each of the first terminal 10A and the second terminal 10B transmits a response to the codec switching request. Specifically, in step S42-5-2, the first terminal 10A and the second terminal 10B determine whether to use the requested codec ("H264"), and subsequently transmit respective responses based on the determined results. That is, when each of the first terminal 10A and the second terminal 10B is able to use the requested codec ("H264" in this example), the response is "OK". On the other hand, when each of the first terminal 10A and the second terminal 10B is not able to use the requested codec, the response is "NG".

In step S42-5-3, when the management system 50 has received the response "OK" from all the terminals (the first terminal 10A and the second terminal 10B in this example), the management system 50 deletes an entry and the like having the conference ID "Conf04" in Table 10. Next, the management system 50 generates a new conference ID and updates codec data including the "common codec", "codec in use", and the like corresponding to the new conference ID in Table 10.

In step S42-5-4, the management system 50 manages the relay apparatuses. Specifically, the management system 50 updates the session management DB 5005 to start a new TV conference.

In step S42-5-5, the management system 50 establishes a session. In this example, the information processing system establishes a new session for conducting a TV conference using a requested codec "H264". Note that the screen and the audio data corresponding to the conference ID "Conf04" are output to the first terminal 10A and the second terminal 10B at this point.

In step S42-5-6, the first terminal 10A and the second terminal 10B that have received the image data and the like switch the screen to a screen for the newly established session.

In step S42-5-7, each of the first terminal 10A and the second terminal 10B transmits a quitting request for quitting the conference having the conference ID "Conf04" to the management system 50.

In step S42-5-8, the management system 50 transmits a response to the quitting request from each of the first terminal 10A and the second terminal 10B.

When the management system 50 receives the quitting request for quitting the conference having the conference ID "Conf04" from each of the first terminal 10A and the second terminal 10B, the management system 50 transmits a conference stop request to the relay apparatus 30 to stop the conference having the conference ID "Conf04". On the other hand, the first terminal 10A, the second terminal 10B, and the third terminal 10C are able to continue the conference based on the newly established session.

Note that the quitting process is not limited to the quitting process in which a quitting request is transmitted each of from the first terminal 10A and the second terminal 10B described above. For example, the quitting request may be transmitted from the management system 50 to each of the first terminal 10A and the second terminal 10B.

Note that two sessions are established in a period between the time at which the new session is established and the time at which the session is switched to the newly established session. This status in which two sessions are established may be so called "double sessions" or the like. The "double sessions" may hereinafter be called "double sessions WS". In this example, the double sessions WS include the already established session using the codec "H265" and the newly established session using the codec "H264". In the case of the double sessions WS, it may be preferable to transmit or receive data and the like via the already established session. In this example, it may be desirable to perform communications with the session using the codec "H265" while the double sessions WS are established.

Moreover, it may be desirable to stop transmitting or receiving data with the session using the codec "H264" while the double sessions WS are established.

For example, to transmit or receive data with both the sessions of the double sessions WS using codecs "H264" and "H265", two sets of data compatible to "H264" and "H265" need to be generated for the two sessions of the double sessions WS. Specifically, two sets of data transmitted or received in the double sessions WS are differently encoded by the CPU of each of the terminals, and hence, differently encoded two sets of the data are generated. In this example, different sets of data are generated for being adapted to the codecs "H265" and "H264". As a result, each of the terminals uses the CPU processing power to perform two different encodings. On the other hand, when one of the sessions transmits or receives the data and the like while the other one of the sessions stops transmitting or receiving the data, only one encoding is required. Thus, the CPU processing power to be used may be reduced.

When the data and the like are transmitted or received in both the double sessions WS, a large amount of data may be transmitted or received, thereby narrowing the remaining bandwidths. On the other hand, when the data and the like are transmitted or received via one of the double sessions WS while the data and the like stop being transmitted or received via the other one of the double sessions WS, the amount of data transmitted or received may be reduced, compared to the amount of data transmitted or received via both of the double sessions WS. Hence, when the data and the like are transmitted or received via one of the double sessions WS while the data and the like stop being transmitted or received via the other one of the double sessions WS, the remaining bandwidths may be prevented from being narrowed.

A newly established session may be composed of partially established parts between the double sessions WS. Hence, when the newly established session includes partially unestablished parts, the video images or the like in communications may be interrupted (disconnected) while the conference is in progress. On the other hand, when the data are transmitted or received via the already established session, the information processing system may be able to prevent video images or the like in communications from being interrupted, compared to the case in which the data are transmitted or received via the newly established session.

Accordingly, the information processing system may be able to change the conference using the codec "H265" conducted between the first terminal 10A and second terminal 10B into the conference using the codec "H264" conducted between the first terminal 10A, the second terminal 10B, and the third terminal 10C.

Note that the determining and switching process is not limited to the example illustrated in FIG. 13. The determining and switching process may be as follows.

Figure 16:
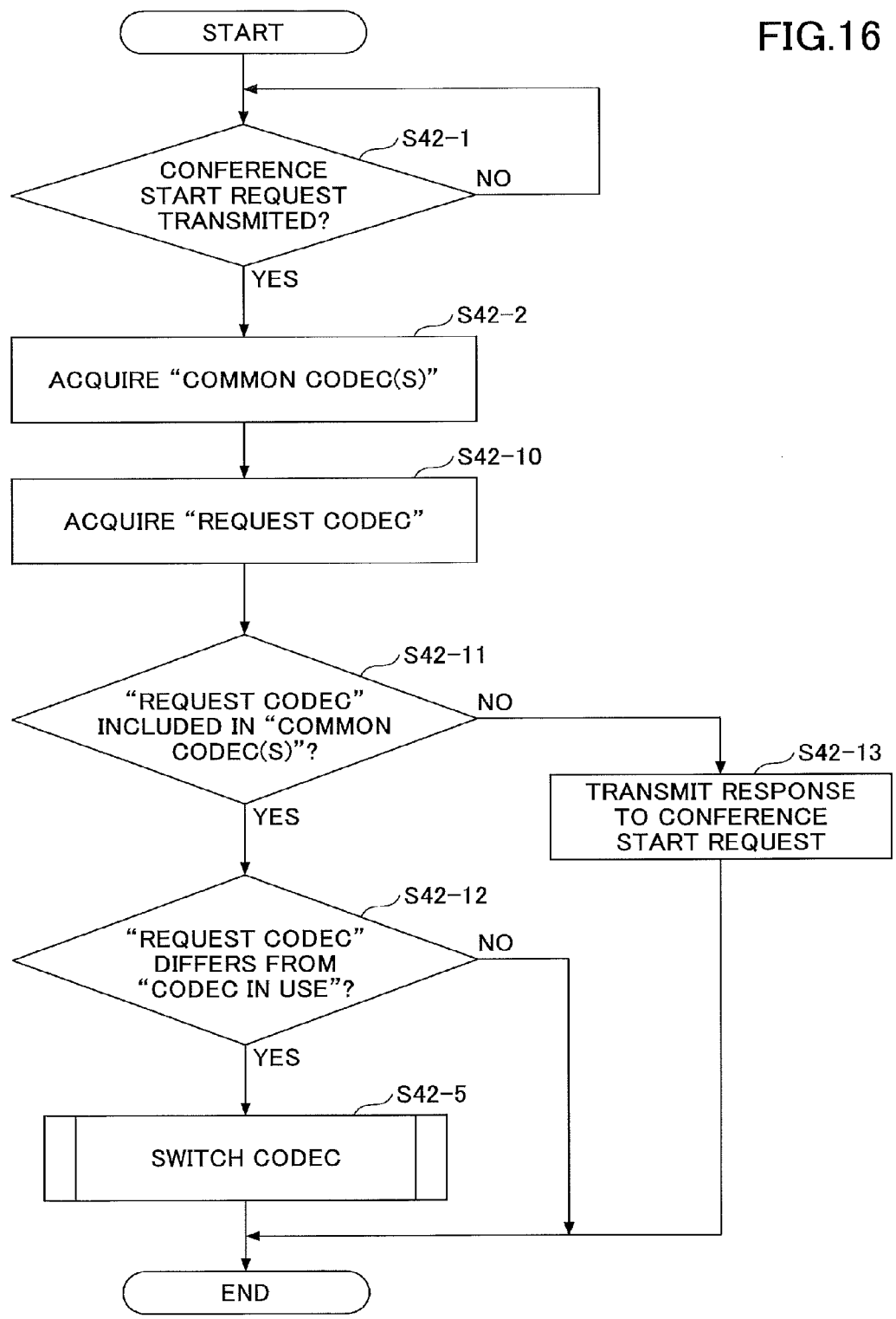
FIG. 16 is a flowchart illustrating another example of a determining and switching process performed by the information processing system according to the embodiment.

FIG. 16 is a flowchart illustrating another example of a determining and switching process performed by the information processing system according to the embodiment. In comparison to the flowchart in FIG. 13, step S42-10 to S42-13 of the flowchart in FIG. 16 differ from the flowchart of FIG. 13. The steps of the flowchart in FIG. 16 identical to the steps of the flowchart in FIG. 13 are provided with the same reference numbers to omit duplicated illustration.

FIG. 16 is an example of a process when the step S41 or the like illustrated in FIG. 12 includes a requested codec. Note that the requested codec may be a codec specified or requested by the user of the third terminal 10C. For example, it is assumed that there is a codec that performs encoding with high CPU processing power such as the codec "H265". When the third terminal 10C is a so-called mobile apparatus, and the CPU processing power is high, the battery energy consumption may also become high. The user of the third terminal 10C may attend a conference by specifying the codec exhibiting low CPU power. That is, the requested codec may be input in the third terminal or the like by the user's operation. When the requested codec is input in the third terminal or the like, the specified codec is transmitted along with a conference start request in step S41 illustrated in FIG. 12. The following illustrates an example in which step S42 includes a requested codec.

In step S42-10, the information processing system acquires a requested codec transmitted in step S41 along with the conference start request.

In step S42-11, the information processing system determines whether the requested codec is included in the "common codec(s)". Specifically, the information processing system determines whether the requested codec is included in the "common codecs" acquired in step S42-2. In the following illustration, it is assumed that the acquired codecs (the acquired common codecs) are "H264" and "H265", and the requested codec is "H264". Hence, the information processing system determines that there is a "common codec" (YES in step S42-11) in this example. Specifically, the information processing system compares a common codec commonly used by all the terminals that attend a conference with the requested codec.

Subsequently, when the information processing system determines that there is a requested codec (YES in step S42-11), the information processing system proceeds with step S42-12. On the other hand, when the information processing system determines that there is no requested codec (NO in step S42-11), the information processing system proceeds with step S42-13.

In step S42-12, the information processing system determines whether the requested codec differs from the "codec in use". Specifically, in step S42-12, the information processing system compares the requested codec and the "codec in use" that is the codec currently used by all the conference attending terminals in the conference having the conference ID "Conf04", and determines whether the requested codec matches the "codec in use" currently used in the conference having the conference ID "Conf04".

When the information processing system determines that the requested codec differs from the "codec in use" (YES in step S42-12), the information processing system proceeds with step S42-5 in FIG. 16. On the other hand, when the information processing system determines that the requested codec does not differ from the "codec in use" (NO in step S42-12), the information processing system ends the process of FIG. 16.

In step S42-13, the information processing system transmits a response to the conference start request. For example, the information processing system returns an error presenting failing to start conference as a response to the conference start request. Receiving such a response to the conference start request, the third terminal 10C may display an error screen and the like depicted in FIG. 14.

The information processing system is unable to start a conference when the requested codec and the "common codec" are compared, and the requested codec is not included in the compatible codecs; that is, the information processing system is unable to start a conference unless the requested codec matches one of the "common codecs". When the information processing system is unable to start a conference due to the mismatch between the requested codec and one of the "common codecs", the error screen and the like may thus be displayed. On the other hand, when the requested codec is included in the "common codec(s)", the requested codec is compared with the "codec in use". Subsequently, when the requested codec matches the "codec in use" that is the codec currently used by all the conference attending terminals in the conference in progress, the information processing system allows the third terminal 10C to participate in the conference using the "codec in use" currently used in the conference.

On the other hand, when the requested codec does not match the "codec in use" that is the codec currently used in the conference in progress, the information processing system switches the "codec in use" currently used in the conference into the requested codec in the switching process illustrated in FIG. 15 or the like. The third terminal 10C may thus be able to attend the conference using a desired codec.

Outline

In the information processing system according to the embodiment, communications are performed between the multiple information processing terminals by causing the information processing terminals to mutually transmit and receive data such as image data, audio data, or combination of the image data and the audio data between the information processing terminals. For example, it is assumed that communications are performed between a first terminal serving as an example of the first information processing terminal and a second terminal serving as an example of the second information processing terminal. The communications performed between the first terminal and the second terminal are called "first communications". The following illustrates an example on the basis of the assumption in which the first communications are performed.

The first communications are performed using a codec (hereinafter called "first codec") capable of being used by the first terminal and the second terminal to perform communications. For example, the first codec is determined based on the "compatible codec(s)" for each of the terminals illustrated in Table 4. In this example, the first codec is determined as a codec common between the "compatible codec" of the first terminal and the "compatible codec" of the second terminal. As already noted above, the codec common between the first terminal and the second terminal is called a "common codec". The first codec is stored as the "common codec" or the like illustrated in Table 10. The information processing system may be able to detect the first codec based on the data (hereinafter called "codec data") including information associated with codecs such as "common codec(s)", "compatible codec(s)", "codec(s) in use" and the like in Table 10.

Next, it is assumed that the third terminal serving as an example of the third information processing apparatus participates in the first communications already being performed. Communications performed between the first terminal, the second terminal, and a newly attending third terminal that has participated in the first communications already being performed are called "second communications". The following illustrates an example of performing the second communications.

The second communications need to be performed using a codec capable of being used by all the first terminal, the second terminal, and the third terminal. The codec for use in performing the second communications is called a "second codec". The codec currently used in the first communications is called a "third codec". For example, the "third codec" indicates the "codec in use" in Table 10 that is the codec currently used in the first communications selected from the "common codec" in Table 10. The codec capable of being used by the third terminal alone is called a "fourth codec".

Initially, the third codec is specified by the "codec in use" and the like in Table 10. That is, the third codec is specified by the codec data. The fourth codec is specified by the "compatible codec" and the like corresponding to the third terminal in Table 4. For example, in step S42-2 of the process illustrated in FIG. 13, the "codec in use" is acquired as an example of the third codec based on the conference ID indicating the first communications in accordance with Table 10.

Subsequently, the process includes comparing the "common codec" and the fourth codec that is capable of being used by the third terminal alone in step S42-3 illustrated in FIG. 13. When the fourth codec being capable of being used by the third terminal alone is included in the acquired common codec, the information processing system allows the third terminal to participate in the second communications using the matched codec (i.e., the "common codec" in Table 10). That is, the information processing system may be able to perform the second communications using the "common codec" as the second codec as noted above.

The information processing system initially compares the first codec (the "common codec") capable of being used by the first terminal and the second terminal with the fourth codec capable of being used by the third terminal. When the fourth codec matches the first codec (the "common codec"), the information processing system determines that the third terminal may participate in the first communications already being performed between the first terminal and the second terminal. Subsequently, the information processing system compares the third codec (the "codec in use") currently used by both the first and the second terminals in the first communications and the fourth codec capable of being used by the third terminal. When the third codec (the "codec in use") differs from the fourth codec being used by the third terminal, the information processing system switches the third codec into the fourth codec used as the second codec that is capable of being used by all the first, the second, and the third terminals. Accordingly, whereas the third codec is used in the first communications between the first and the second terminals, the fourth codec is used as the second codec for performing the second communications between the first, the second, and the third terminals. The information processing system may thus enable conducting a TV conference or the like by switching the third codec into the fourth codec so as to allow all the first, the second, and the third terminals to attend the TV conference or the like.

Compared to a case in which the information processing apparatus performs different encodings on data being transmitted to or received from the different terminals, the information processing system according to the embodiment performs communications using the second codec (i.e., the "common codec" used by all the conference attending terminals). The information processing system is thus capable of reducing process burdens caused by the use of different encodings and the like. The information processing system according to the embodiment may be able to reduce process burdens for performing communications.

There is a case where the third terminal specifies a requested codec to newly attend the conference. That is, the second communications are directed to be performed with the requested codec. In this case, the information processing system initially compares the first codec with the requested codec as illustrated in FIG. 16. When the compared result indicates that the requested codec is included in the first codec, the first terminal and the second terminal may be able to perform communications with the requested codec. Specifically, the information processing system compares the first codecs accessible by the first terminal and the second terminal with the requested codec. Then, when the information processing system determines that the requested codec is accessible by both the first terminal and the second terminal, the information processing system allows the first terminal and the second terminal to perform the second communications with the requested codec.

Subsequently, the information processing system compares the currently used third codec and the requested codec.

When the compared result indicates that the third codec differs from the requested codec, the information processing system switches the currently used third codec into the requested codec. The third codec is used in the first communications whereas the requested codec is used as the second codec used in the second communications. The information processing system thus enables conducting a TV conference or the like by causing all the first, the second, and the third terminals to attend the TV conference or the like with the codec desired by the user of the third terminal.

Further, various types of processing may include redundant processing, decentralized processing, and parallel processing, or combinations of the redundant processing, the decentralized processing, and the parallel processing.

Note that the above-described embodiments may be implemented by a program for causing a computer such as an information processing system having an information processing terminal, an information processing apparatus, or one or more information processing apparatuses to execute an information processing method.

The information processing system according to the above-described embodiments may be able to reduce process burdens for performing communications.

Note that definitions of terms used in the specification and claims are noted below.

The first codec is a "common codec" that indicates a "compatible codec" commonly used between the first terminal and the second terminal.

The second codec is a "codec in use" that is used in the second communications.

The third codec is a "codec in use" that is currently used in the first communications.

The fourth codec is a "compatible codec" specific to the third terminal.

The codec data indicate data including the first codec, the second codec, the third coded, the fourth coded, and the like.

The first communications indicate communications performed between the first terminal and the second terminal using the third codec.

The second communications indicate communications performed between the first terminal, the second terminal, and the third terminal using the second codec.

The preferred embodiments of the present invention are described above. However, the present invention is not limited to the specifically disclosed embodiments, and variations, alterations and modifications may be made without departing from the gist of the embodiment recited in the scope of the present invention.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention is not limited to the specifically disclosed embodiments, and variations and modifications may be made without departing from the scope of the present invention.

What is claimed is:

1. An information processing system that encodes video data to transmit the encoded video data for holding a conference among a plurality of information processing terminals, the information processing system comprising:
    an acquirer configured to acquire encoding process information concerning encoding processes capable of being used by the information processing terminals;
    a first determiner configured to determine whether there is an encoding process usable by all of the plurality of information processing terminals, based on the encoding process information acquired by the acquirer;
    a second determiner configured to determine, when the first determiner determines that that there is an encoding process usable by all of the plurality of information processing terminals, whether the encoding process usable by all of the plurality of information processing terminals is the same as an encoding process that is used during the conference; and
    a joining unit configured to cause the plurality of information processing terminals to join the conference by using the encoding process usable by the plurality of information processing terminals when the second determiner determines that the encoding process usable by all of the plurality of information processing terminals is the same as the encoding process used during the conference.

2. The information processing system according to claim 1, further comprising:
    a transmitter configured to transmit conference information on a conference held by any of the plurality of information processing terminals; and
    a manager configured to associate the conference information, identification information of the information processing terminals joining the conference, information relating to the encoding process usable by all the information processing terminals joining the conference, and the encoding process used during the conference to manage the associated information.

3. The information processing system according to claim 1, further comprising:
    a display unit configured to display an error when the first determiner determines that that there is no encoding process usable by all of the plurality of information processing terminals.

4. The information processing system according to claim 1, wherein
    when the second determiner determines that the encoding process usable by all of the plurality of information processing terminals is not the same as the encoding process used during the conference, the encoding process used during the conference is switched to the encoding process usable by all of the plurality of information processing terminals.

5. A method for encoding video data to transmit the encoded video data for holding a conference among a plurality of information-processing terminals, the method comprising:
    acquiring, using circuitry, encoding process information of encoding processes capable of being used by the information processing terminals;
    determining, using the circuitry, whether there is an encoding process usable by all of the plurality of information processing terminals, based on the encoding process information;
    determining, using the circuitry, when it is determined that that there is an encoding process usable by all of the plurality of information processing terminals, whether the encoding process usable by all of the plurality of information processing terminals is the same as an encoding process that is used during the conference; and
    causing, using the circuitry, the plurality of information processing terminals to join the conference by using the encoding process usable by the plurality of information processing terminals when it is determined that the encoding process usable by all of the plurality of information processing terminals is the same as the encoding process used during the conference.

* * * * *